(12) United States Patent
Buja

(10) Patent No.: US 7,585,166 B2
(45) Date of Patent: Sep. 8, 2009

(54) SYSTEM FOR MONITORING TEMPERATURE AND PRESSURE DURING A MOLDING PROCESS

(76) Inventor: Frederick J. Buja, 184 D Kingsberry Dr., Rochester, NY (US) 14626

( * ) Notice: Subject to any disclaimer, the term of this patent is extended or adjusted under 35 U.S.C. 154(b) by 152 days.

(21) Appl. No.: 11/381,246

(22) Filed: May 2, 2006

(65) Prior Publication Data

US 2006/0246167 A1 Nov. 2, 2006

Related U.S. Application Data

(60) Provisional application No. 60/676,761, filed on May 2, 2005, provisional application No. 60/745,871, filed on Apr. 28, 2006.

(51) Int. Cl.
*B29C 45/77* (2006.01)
*B29C 45/78* (2006.01)
(52) U.S. Cl. .................. 425/143; 425/144; 425/149
(58) Field of Classification Search .......... 425/143, 425/144, 149
See application file for complete search history.

(56) References Cited

U.S. PATENT DOCUMENTS

| | | |
|---|---|---|
| 3,314,129 A | 4/1967 | Pugh et al. |
| 3,867,205 A | 2/1975 | Schley |
| 3,942,242 A | 3/1976 | Rizzolo |
| 4,018,624 A | 4/1977 | Rizzolo |
| 4,191,194 A | 3/1980 | Watanabe |
| 4,493,564 A | 1/1985 | Epstein |
| 4,527,005 A | 7/1985 | McKelvey et al. |
| 4,579,002 A | 4/1986 | Zettler |
| 4,681,099 A | 7/1987 | Sato et al. |
| 4,705,498 A | 11/1987 | Goss |
| 4,715,221 A | 12/1987 | Grims et al. |
| 4,721,589 A | 1/1988 | Harris |
| 4,816,197 A | 3/1989 | Nunn |
| 4,848,147 A | 7/1989 | Bailey et al. |
| 4,850,217 A | 7/1989 | Nunn |
| 4,932,250 A | 6/1990 | Assaf et al. |
| 4,983,336 A | 1/1991 | Langlois |
| 5,043,023 A | 8/1991 | Bentley |
| 5,069,222 A | 12/1991 | McDonald, Jr. |
| 5,158,366 A | 10/1992 | Nagai et al. |
| 5,205,293 A | 4/1993 | Ito et al. |
| 5,320,513 A | 6/1994 | Schmidt |
| 5,419,858 A | 5/1995 | Hata et al. |

(Continued)

FOREIGN PATENT DOCUMENTS

CA 2274308 4/2005

OTHER PUBLICATIONS

Buja, F.J.; Using Mold Opening to Relate the Molding Process to Molded Product; KTechnologies c. 1986.

(Continued)

*Primary Examiner*—Tim Heitbrink
(74) *Attorney, Agent, or Firm*—Duane C. Basch; Basch & Nickerson LLP

(57) ABSTRACT

Disclosed are systems and methods for the use of a micro-bead EMF junction in the sensing and control of an injection molding process, whereby the improved junction is able to reliably sense and indicate temperature and pressure changes in a molding process.

16 Claims, 22 Drawing Sheets

U.S. PATENT DOCUMENTS

| | | | |
|---|---|---|---|
| 5,520,461 A | 5/1996 | Curry | |
| 5,665,283 A | 9/1997 | Bader et al. | |
| 5,707,659 A | 1/1998 | Erikson | |
| 5,772,933 A | 6/1998 | Kotzab | |
| 5,832,592 A | 11/1998 | Bowman et al. | |
| 5,902,252 A | 5/1999 | Hohlfeld et al. | |
| 5,937,853 A | 8/1999 | Strom | |
| 5,945,046 A | 8/1999 | Hehl et al. | |
| 5,959,195 A | 9/1999 | Gottfert | |
| 5,980,237 A | 11/1999 | Swenson et al. | |
| 5,993,704 A | 11/1999 | Bader et al. | |
| 6,006,601 A | 12/1999 | Osborne | |
| 6,077,228 A | 6/2000 | Schonberger | |
| 6,077,470 A | 6/2000 | Beaumont | |
| 6,084,174 A | 7/2000 | Hedengren et al. | |
| 6,090,318 A | 7/2000 | Bader et al. | |
| 6,293,700 B1 | 9/2001 | Lund et al. | |
| 6,464,909 B1 * | 10/2002 | Kazmer et al. | 425/145 |
| 6,503,438 B2 | 1/2003 | Beaumont et al. | |
| 6,649,095 B2 | 11/2003 | Buja | |
| 6,862,932 B2 | 3/2005 | Zimmermann et al. | |
| 7,050,846 B2 | 5/2006 | Sweeney et al. | |
| 7,051,120 B2 | 5/2006 | Greene et al. | |
| 7,052,456 B2 | 5/2006 | Simon | |
| 7,055,520 B2 | 6/2006 | Swisa | |
| 7,060,030 B2 | 6/2006 | Von Arx et al. | |
| 7,062,327 B2 | 6/2006 | Bradley et al. | |
| 7,063,669 B2 | 6/2006 | Brawner et al. | |
| 7,064,270 B2 | 6/2006 | Marshall et al. | |
| 7,065,396 B2 | 6/2006 | Hampton | |
| 7,065,409 B2 | 6/2006 | Mazar | |
| 7,128,714 B1 | 10/2006 | Antonelli et al. | |
| 7,181,264 B2 | 2/2007 | Wiesmann et al. | |
| 7,278,937 B2 * | 10/2007 | Laliberty et al. | 473/593 |
| 2002/0097155 A1 | 7/2002 | Cassell | |
| 2004/0185142 A1 | 9/2004 | Olaru | |
| 2005/0277872 A1 | 12/2005 | Colby | |
| 2006/0206029 A1 | 9/2006 | Yair | |
| 2008/0039739 A1 | 2/2008 | Buja | |

OTHER PUBLICATIONS

Dynisco Technical Reference; "Using Pressure Transducers to Improve Control of the Extrusion Process"; pp. 170-174.

"Selecting the Right Thermocouple: There are more choices today"; Reprinted from the Plastics Technology; NANMAC Corporation; www.nanmac.com; c. 1998.

Temperature Sensors for Industry; www.noraltemperaturesensor. com; Noral, Inc.

"Heaterless Injection machine Nozzles"; Dynisco Instruments; www.dynisco.com.

Koelsch, J.R., Contributing Editor; "Temperature control Builds Better Injection Molding"; Quality Magazine; May 2000; www.qualitymag.com/articles/2000/may00/0500f3.asp.

Kistler; Nozzle Pressure Measuring Chain for Injection Molding Machines.

Kistler; P-T Sensor for Molding Cavity Pressure and Temperature.

Buja, F.J.; Establishing the molding Process and Molded Product "Consistency"; Revised Jun. 1990; Presented last by F.J. Buja in Chicago at National Plastics Expo, Jun. 1994.

Sheth, H.R.; Nunn, R.E.; An Adaptive Control Methodology for the Injection Molding Process, Part 2: Experimental Application; University of Massachusetts Lowell, Department of Plastics Engineering, Lowell MA.

Rosato, D.V. and Rosato, D.V.; Injection Molding Handbook; $2^{nd}$ Edition; ISBN 0-412-99381-3; pp. 512-580 ; c. 1995 Chapman & Hall, New York, NY.

Bader, C.; Burkhart, C.; König, E.; "Controlled Conditions"; Kunstoffe Plast Europe Jul. 2007; c. Carl Hanser Verlag, Münich.

Love, A.; A treatise on the mathematical theory of the elasticity; fourth edition revised ; C.. 1927 ; 92 to 94 ; 117 ; 140 to 141 ; 146 to 151; ISBN 0-486-60174 -9; Dover Publications, Inc., Mineola NY 11501.

Digital Optics Corporation; standard processes Oct. 19, 2004 ; process specification sheet ; one page ; Digital Optics Corporation; 8701 Mallard Creek Road , Charlotte North Carolina 28262 (704)-549-5556.

The Merck Manual of Diagnosis and Therapy; $18^{th}$ Edition; C. 2006 Merck & Co., Inc.; pp. 589-596; pp. 2549-2550.

Prosecution History for US 6,649,095.

An unofficial copy of a partial file history of U.S. Appl. No. 11/838,491.

* cited by examiner

MOLDING CYCLE VENT DATA (°C)

| POINT | TEMP°C | °C | TIME (S) | SEC | CYC TIME |
|---|---|---|---|---|---|
| 1 OPEN | 40.11° | 0.00 | 76.20 | 0.00 | 0.00 |
| 2 → | 39.50 | -0.61°C | 77.80 | 1.60 | 1.60 CLOSED |
| 3 | 40.89 | +1.39°C | 86.00 | 8.20 | 9.80 |
| 4 | 38.92 | -1.97 | 88.20 | 2.20 | 12.00 |
| 5 | 40.11 | +1.94° | 90.10 | 1.90 | 13.90 |
| 6 | 39.19 | -0.92° | 92.70 | 2.60 | 16.50 |
| 7 | 41.17 | +1.97° | 94.00 | 1.30 | 17.80 |
| 8 | 41.03 | -0.14° | 95.00 | 1.00 | 18.80 |
| 9 | 41.64 | +0.62° | 100.80 | 5.80 | 24.60 |
| 10 OPEN | 40.11° | -1.53° | 123.00 | 22.20 | 46.80 CYCLE |
| 1 → | 39.50 | -0.61° | 125.00 | 2.0 | 1.60 |

SYSTEM FOR MONITORING TEMPERATURE AND PRESSURE DURING A MOLDING PROCESS

This application claims priority from U.S. Provisional Application 60/676,761 for a "MELT DENSITY SENSING SYSTEM AND METHOD," by Frederick J. Buja, filed May 2, 2005, and from U.S. Provisional Application 60/745,871 for a "MEANS TO SENSE AN INJECTED MELT FLOW FRONT CAVITY GAS VENTING AND PEAK MELT DENSITY POINT AND TIME TO FORM A MOLDED PART," by Frederick J. Buja, filed Apr. 28, 2006, both provisional applications being hereby incorporated by reference in their entirety.

This invention relates generally to a system and method for sensing one or more temperature and pressure characteristics for a molding system, and more particularly the accurate and reliable sensing of temperature and pressure form or profile changes during an entire molding process, during mold open and mold close stages in order to enable the characterization of the molding process stages and the material melt volume change in one or more mold cavity segments.

COPYRIGHT NOTICE

A portion of the disclosure of this application document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

It will be appreciated that the highly accurate sensing of temperature in a molding process system may not only lead to relevant information as to the operation of the system, or a mold therein, but may also provide information indicative of the characteristics of the melt material (e.g., density) stages to form a part. The following related patents are examples of the use of information relative to temperature of a molding system, and are also hereby incorporated by reference for their teachings: U.S. Pat. No. 6,649,095 to Buja, issued Nov. 18, 2003; and U.S. Pat. No. 4,904,172 to Buja issued Feb. 27, 1990.

As previously indicated by Buja in U.S. Pat. No. 6,649,095, it is possible to sense the mold cavity melt volume conditions in injection molding systems so that molded articles of uniform consistency and quality are produced at all times irrespective of fluctuations in the flow properties of mold resin. Disclosed was an invention that relied upon novel methods and techniques for sensing and monitoring a temperature profile at one or more locations in a molding system.

More recently it has further been determined that volumetric temperature and pressure changes can be sensed using improved micro-bead thermocouple junctions and that such devices can be used at many mold locations to accurately and reliably monitor volumetric temperature and pressure in the operation of a molding system. In one embodiment, such sensors can be placed in a machined mold part line vent groove to provide temperature and pressure data; to indicate open mold state and closed mold machine, and further monitor the melt flow volume from the initial start of melt flow in the mold process through each sequential process stage, for example, even as the melt material cures to a solid molded part.

In injection-molding machines the cyclic thermal-mechanical operating precision and stability of the equipment has been greatly improved through improvements in the control circuitry used, along with the use of "real-time" closed-loop machine process control. However, the plastic material or "melt" used to mold a part, in the injection molding industry, is produced by a complicated polymerization reaction. The occurrence of some variance in the "melt" and "flow" properties of the plastic material cannot be avoided due to variability in the raw material and difficulties in controlling the polymerization reaction. In particular, in resin materials produced by a batch method, maintaining the material properties constant from one batch to another is extremely difficult.

For example, the value of the melt-flow index (MFI— determined using a five minute static state and five minute "melt" extruding time test) often fluctuates by approximately 10% with respect to the specified value for a particular material. Furthermore, in the case of a colored material, there is a further variance in properties from one color to another due to differences in the pigments and the compounding of additives. Even if the control precision of an injection-molding machine is improved, however, a disparity of temperature-pressure melt volume density, and quality, in the molded articles arises as a result of fluctuations in resin "melt-flow," which affects the "shrink" properties for the molded part(s). It is often the case that a fluctuation in the quality (dimension, weight, density, warping etc.) of the molded articles results when resin "melt-flow" lots are changed over from one to another. Accordingly, a technician must often monitor the molding machine and mold temperature at all times to address any fluctuation in resin "melt-flow" properties. And the technician must try to adjust the parameters for the automated melt and mold process to eliminate any variance in quality of the molded articles.

It will be appreciated that the molding process is a cyclic sequence starting from a mold open, reasonably static thermal state, to a mold close thermal-mechanical melt flow injection state of material melted and stored from the previous cycle. The present invention employs an improved thermocouple sensor, or micro-bead thermocouple with an exposed junction, to sense temperature-pressure volumetric changes as the trapped site and melt flow front gases are exhausted during the material volumetric initial fill and final pack cures in the mold cavity during the molding operation or cycle including the above-identified stages. For example, the sensor may be employed to indicate a start of the molding process sequence, where the mold open to close and clamp stage must occur before the melt flow injection occurs.

Aspects of the present invention also rely on the fact that the injection of a melt (liquid material) into a closed mold cavity forces the gases enclosed in the cavity out the mold cavity vent(s) or groove(s) put in the mold for that purpose. If the mold venting is not included, the compressed trapped gas will heat up and initiate a burn mark on the compressing melt. If a trapped gas, melt burning problem is not resolved, the burning may further erode a pit into the mold cavity.

An object of the present invention is, therefore, to provide improved methods and means for sensing temperature-pressure melt flow changes within a molding system. Accordingly, the attached figures illustrate various embodiments employed or designed to sense temperature-pressure changes in a highly-reliable and accurate manner at, for example, a nozzle, ejector pin and/or mold vent. Moreover, the system contemplates the manner in which the thermocouples are assembled relative to the mold and other system components so as to provide a system suitable for reliable and repeatable use.

As will be illustrated in the following detailed description, data obtained from one or more of the micro-bead sensors may be employed as an input to a melt/molding system controller so as to monitor the molding process consistency and optimize the performance of one or more aspects of such a system. Such a system can then be employed to analyze and optimize the injection molding process cycle, temperature-pressure density for minimum weight, and to eliminate wasteful time and energy from such cycles, while also assuring that the molding system is producing accurate parts by remaining within acceptable operational parameter ranges.

Disclosed in embodiments herein is an injection molding system, including: a multi-variable sensor comprising dissimilar metals formed into a micro-bead junction; and a programmable device, with associated memory, connected to and receiving a signal from said sensor, said programmable device periodically receiving the signal and recording said signal to record changes in said signal, wherein said programmable device is capable of storing said signals as data.

Further disclosed in embodiments herein is a sensing system for use with a molding system, including: a melt orifice, positioned such that melt material flows adjacent said orifice under normal injection molding parameters; an unsheathed sensor suitable for insertion into said orifice, said sensor further comprising a junction of dissimilar metals forming an EMF junction in direct contact with a molding material; and means for retaining the sensor in the orifice.

BRIEF DESCRIPTION OF THE DRAWINGS

FIGS. 23A, 23B and 24 are illustrative examples of an alternative embodiment disclosed for use with a sensor located in a vent groove or the like;

Figure 1:
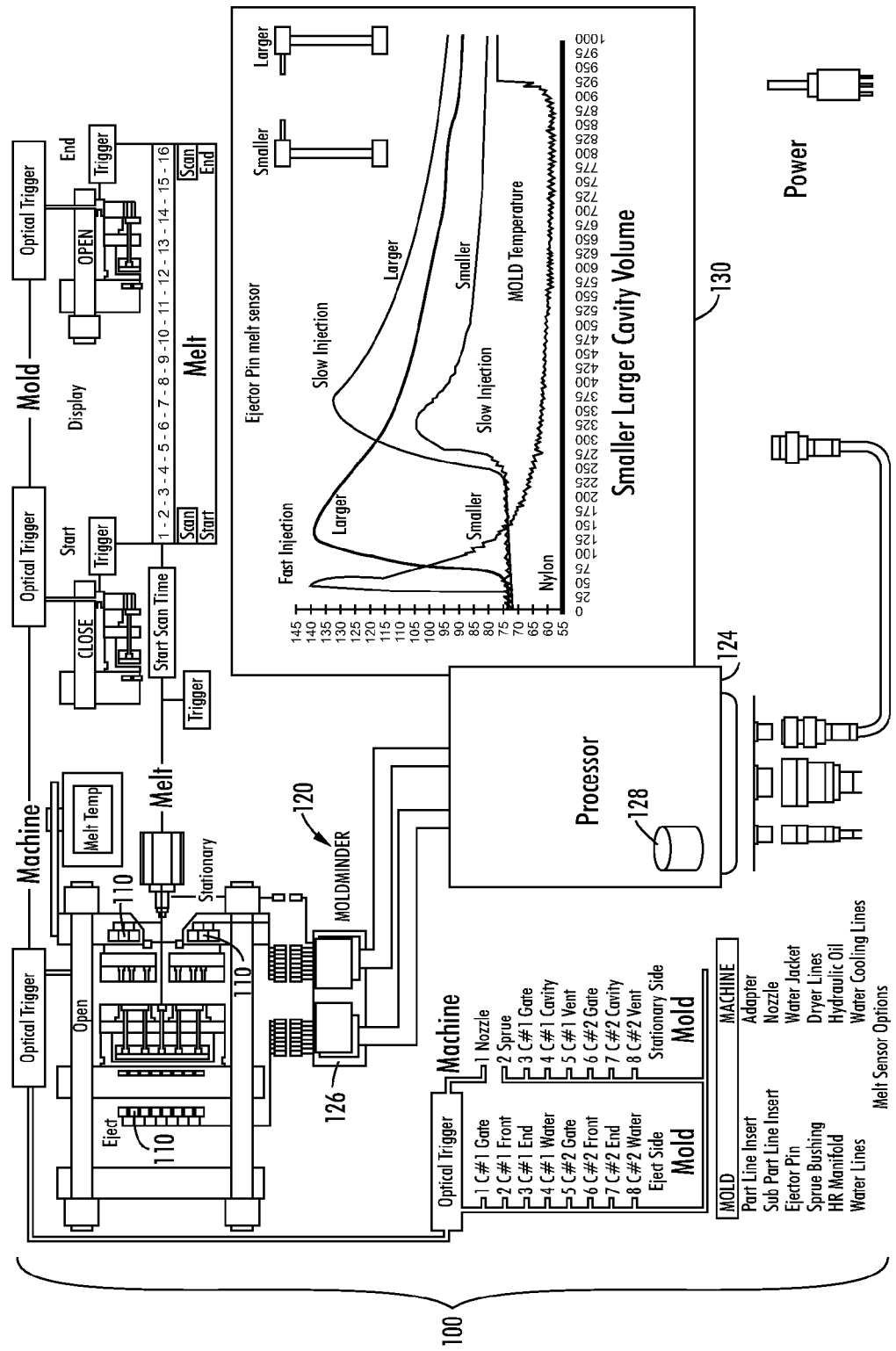
FIGS. 1 and 2 are representations of a molding system employing aspects of the present invention.

The various embodiments described herein are not intended to limit the invention to those embodiments described. On the contrary, the intent is to cover all alternatives, modifications, and equivalents as may be included within the spirit and scope of the invention as defined by the appended claims.

DETAILED DESCRIPTION

As more particularly set forth below, the disclosed system and methods are directed to the use of a micro-bead sensing device for sensing temperature and/or pressure variations in a manufacturing process (e.g., part weight), for example a molding process. For example, referring to FIG. 1, there is depicted an injection molding system 100, including a multi-variable (e.g., temperature and/or pressure) sensor 110 comprising dissimilar metals formed into a micro-bead having a generally spherically shaped junction and a programmable device 120, such as a processor 124 and associated sensor interface 126, with associated memory 128, connected to and receiving a signal from said sensor, said programmable device periodically receiving the signal and recording said signal to record changes in said signal, wherein said programmable device is capable of storing said signals as data, and where said date may be depicted or displayed as a series of traces or profiles on a display screen 130. Although the various embodiments disclosed herein are described relative to an injection molding process, aspects of the disclosed invention are applicable to other temperature and pressure dependent manufacturing operations, including but not limited to blow molding, extrusion, gas and/or liquid filled molding, metal injection molding, thermo-sets, reaction injection molding, thermoforming, etc.

Figure 2:
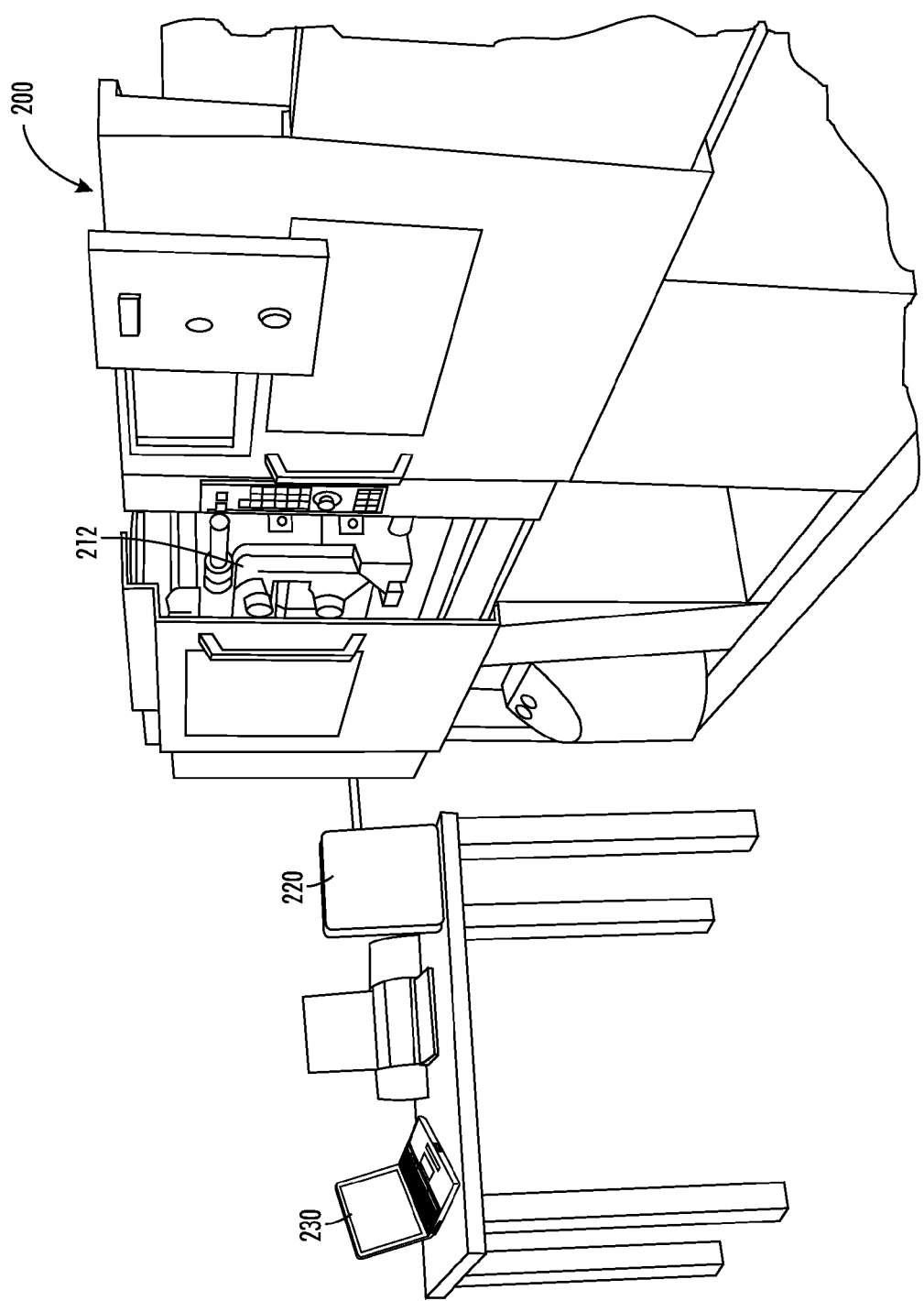

Referring also to FIG. 2, depicted therein is an exemplary embodiment for aspects of the current invention. Such an embodiment includes, for example, a 55-Ton Nissei injection molding machine 200, with a melt temperature-pressure detecting device 210, having a mold 212 installed therein. The mold or possibly the molding machine includes, or has operatively associated therewith, at least one multi-variable (e.g., temperature and/or pressure) sensor comprising dissimilar metals formed into a micro-bead having a generally spherically shaped junction (not shown). The sensor is, likewise, electrically connected to a signal conditioning and transmission device 220, where the signals from the sensor are periodically read and stored for transmission to a programmable device such as laptop computer 230.

In a sensing/monitoring only configuration, the system of FIG. 2 does not include any feedback other than that which is visually displayed to an operator of the molding machine peak temperature-pressure as depicted, for example, in the display region of FIG. 1. It is, however, contemplated as an embodiment of the present invention that the programmable melt temperature-pressure detecting device 210 may include an automated output that controls one or more operations or parameters associated with the molding operation, including but not limited to an output quality indicator for one or more mold cavities being used. In other words, the programmable device may be used to not only analyze and control the operation of the molding system, but also to provide an indication of the melt temperature-pressure, peak density time and reference to the quality of the molded part(s).

Figure 3:
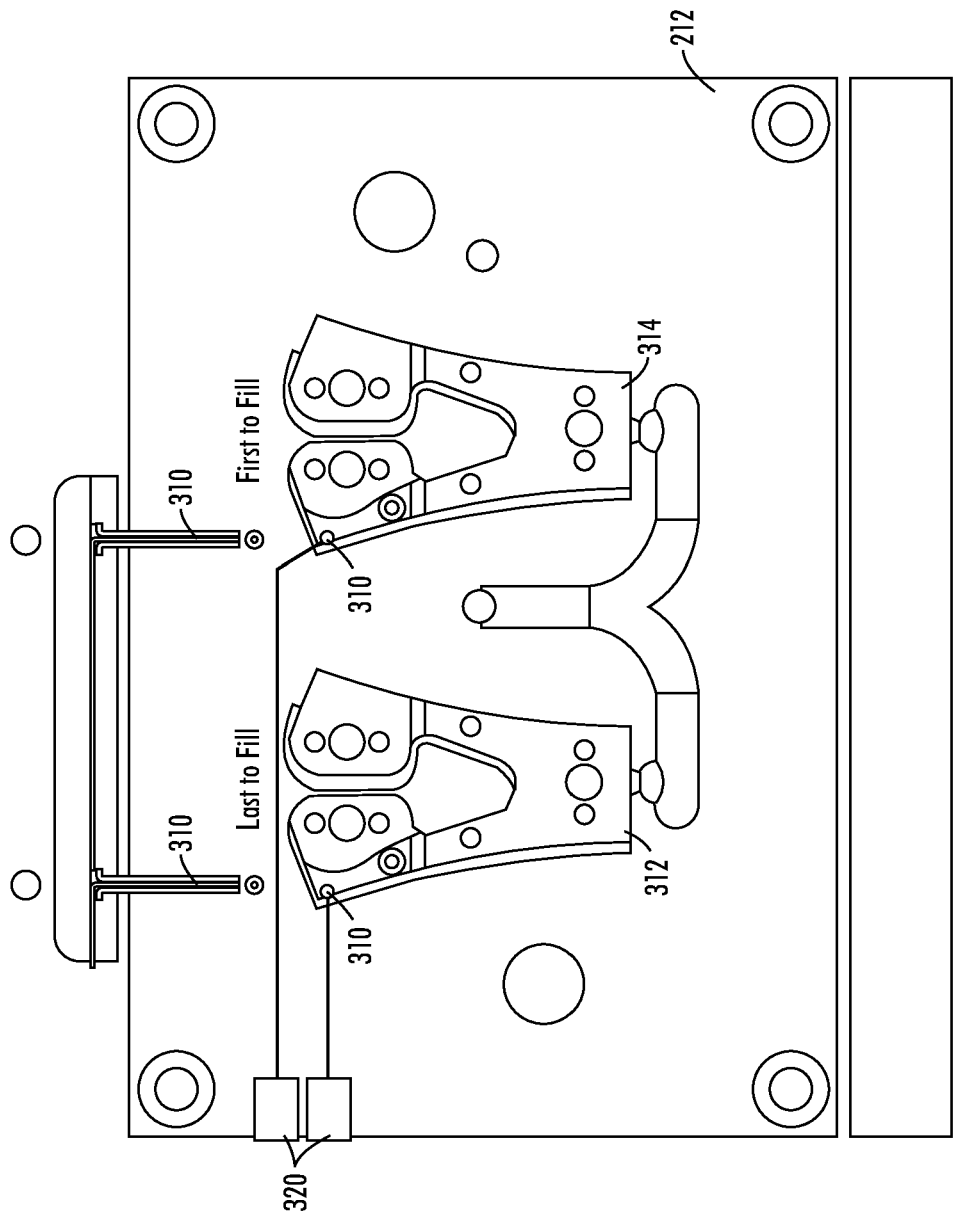
FIGS. 3 and 4 are exemplary embodiments of one aspect of the present invention where the sensor is applied via an ejector pin in an injection molding cavity.
Figure 4:
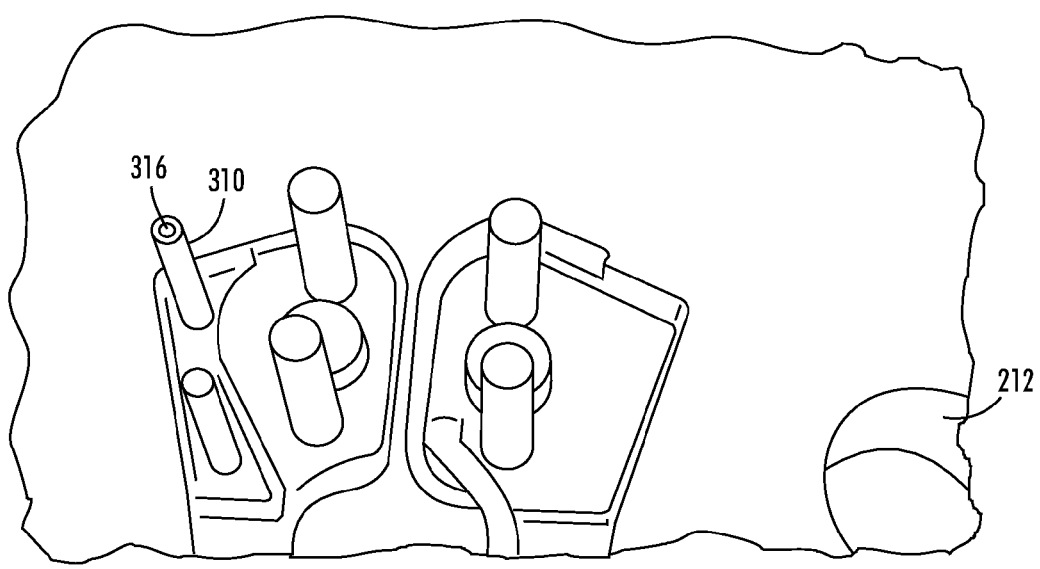

Referring next to FIG. 3, depicted therein is one of several possible embodiments for placement of the sensor in accordance with an aspect of the present invention. In particular, FIGS. 3 and 4 depict the placement of the sensor through and terminating at the end of an ejector pin 310 in a mold 212. In the mold 212, the cavities 312 and 314 include approximately 20 cm² of area, while the runner area is approximately 6 cm². As represented by the differential shading of the two cavities, the rightmost cavity 314 is the first to fill whereas the leftmost cavity 312 is the last to fill of the two cavities.

In the embodiment depicted, the sensor is inserted through a hole bored into the ejector pin. For example, using a 0.078 inch diameter ejector pin, a 0.042 inch diameter hole is bored from the exposed end for a distance of approximately 0.38 inches. A similar bore is initiated from the opposite end, and has a diameter of approximately 0.048 inches. As will be described, these holes are bored, along with slots at the outer end of the pin, to provide a channel through which the sensor, a micro-bead thermocouple 316, can be inserted to place the junction of the thermocouple in proximity to or in direct contact with the molded part. The ability to accomplish this placement is partly a function of the reduced size of the thermocouple wire leads (0.010 inch or smaller) and the thermocouple junction bead as will be further described below. As depicted in the alternative view at the top of FIG. 3, the sensor leads and junction bead are fed through the hollowed injector pin and some excess wire is fed through a recessed groove to a connector that moves with the other ejector pins in the moving plate. The leads are then continued to a location near the edge of the mold 212, where they are terminated in a traditional connector 320, which may be connected to the data acquisition and conditioning device 220 as previously described. In one embodiment, device 220 may be a networked data acquisition device suitable for receiving a plurality of signals from sensors such as thermocouples and temporarily storing such data before transferring the data to another device using a conventional network and protocol such as Ethernet or the like, and includes, for example, the MoldMinder system developed by Nyno Technologies, Inc.

The use of the ejector pin as a means for inserting the thermocouple bead into the mold cavity is one that permits the use of a thermocouple sensor in ejector pins and adding a wire way as the mold modifications. Moreover, the ejector pin typically provides a surface location within the mold that is not critical, thereby permitting the use of a thermocouple that is in direct contact with the molded part. In this way, the present invention may be used to accurately sense the temperature and pressure profile of the mold cavity.

Figure 5A:
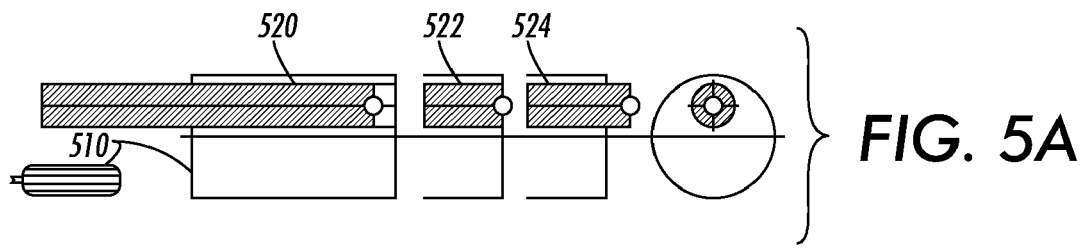
FIGS. 5A-5D are alternative illustrations of sensor placement in various pin configurations discussed herein.
Figure 5B:
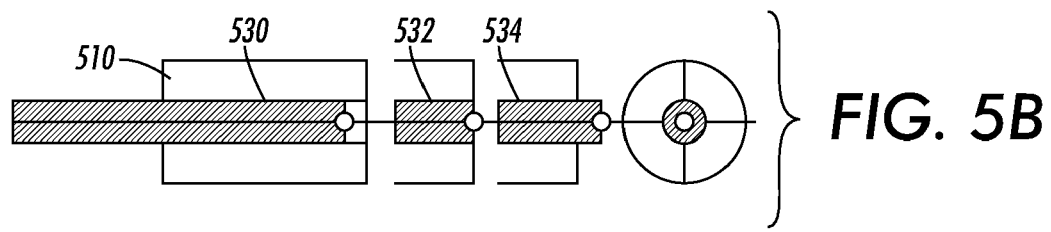

Turning next to FIGS. 5A-5D, there are depicted alternative configurations for mold pin insertions to sense cavity melt flow in accordance with alternative embodiments of the present invention. For example, in FIGS. 5A and 5B, there are depicted alternative views of a stationary pin 510 where the sensor placement is offset relative to the centerline of the pin. In FIG. 5A, there are also representations 520, 522 and 524, which respectively show recessed, flush and extended placement of the sensor or thermocouple tip in the stationary pin. Likewise FIG. 5B shows the various placements of the sensor bore created along the centerline of the pin. Again, representations 530, 532 and 534, respectively show recessed, flush and extended placement of the sensor tip or thermocouple bead in the stationary pin.

Figure 5C:
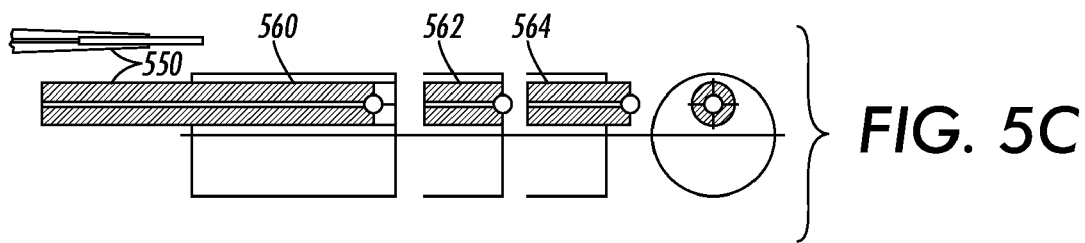
Figure 5D:
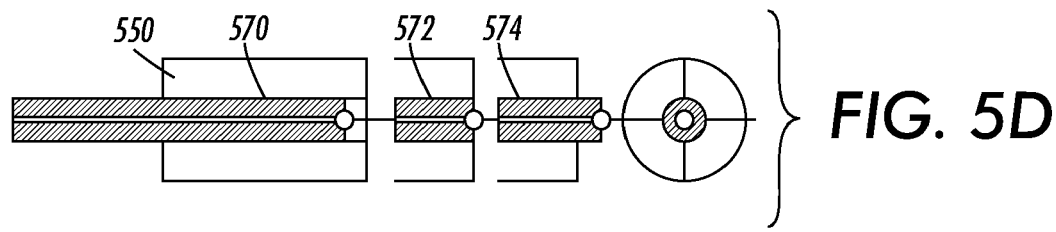

FIGS. 5C and 5D represent various alternative locations for placement of the bore and sensor tip in association with an ejector pin 550. In particular, representations 560, 562 and 564, respectively illustrate the recessed, flush and extended placements of the thermocouple bead in the ejector pin. Likewise FIG. 5D shows alternative placements of a sensor bore created along the centerline of the ejector pin 550. Again, representations 570, 572 and 574, respectively show recessed, flush and extended placement of the sensor tip or thermocouple bead in the ejector pin.

Figure 6:
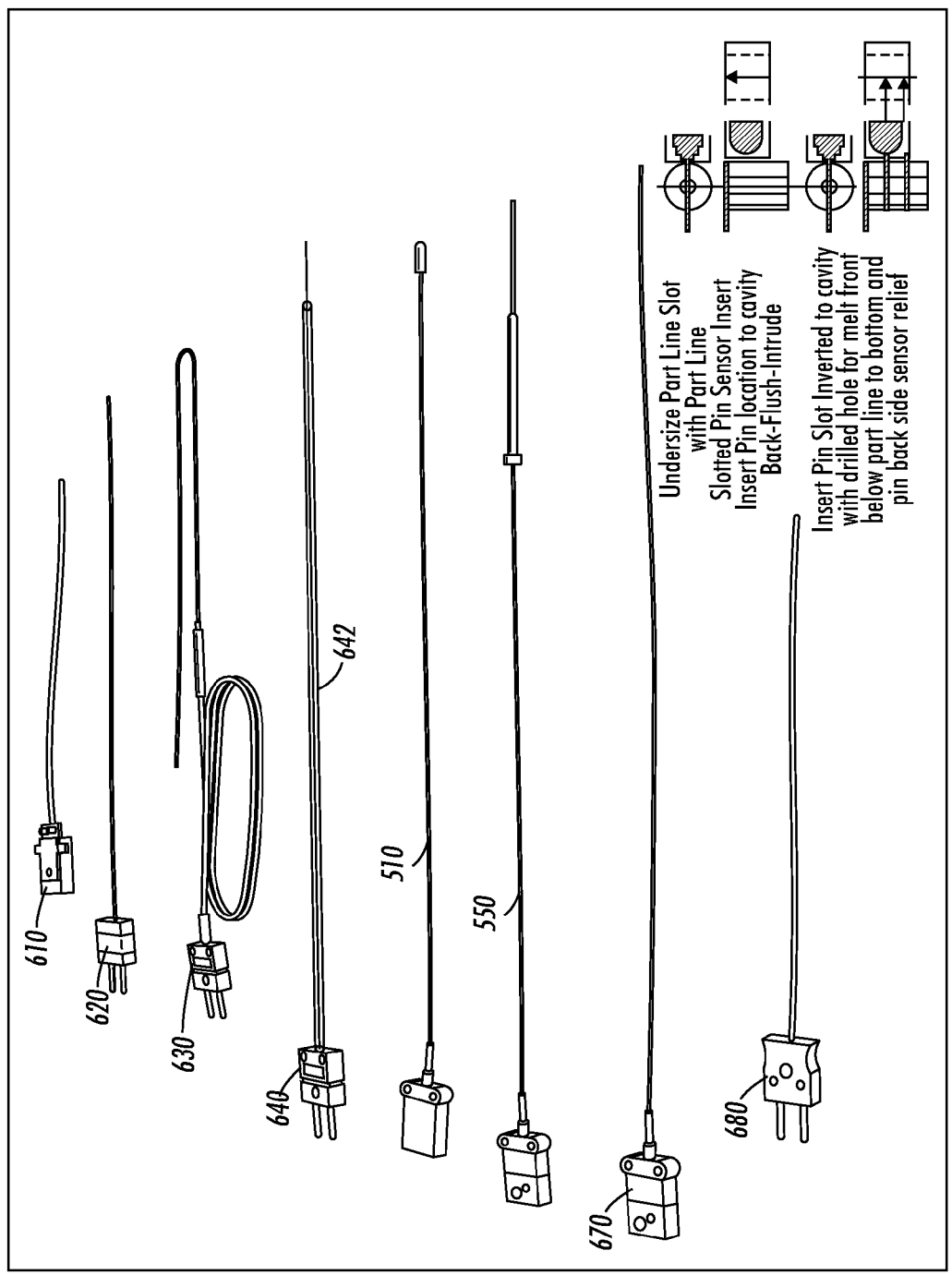
FIG. 6 includes the illustration of a plurality of multivariable (thermal-mechanical) sensors in accordance with aspects of the instant invention.

Referring next to FIG. 6, there are depicted a plurality of alternative sensor (thermocouple) configurations. Included in the figure are a typical thermocouple connector 610 and an associated pair of thermocouple wire leads, a sheathed thermocouple with an exposed junction 620, an extended sheathed wire from a solid junction 630 having a coiled extension for the connector, a sheathed thermocouple with an exposed junction 640 enclosed in a packing/storage sleeve 642, sensors 510 and 550 from the prior figures, sensor 670 which is a longer sheathed thermocouple with an exposed junction, and 680 which is an illustration of two insulated micro-wire sheathed thermocouple assemblies.

Figure 7A:
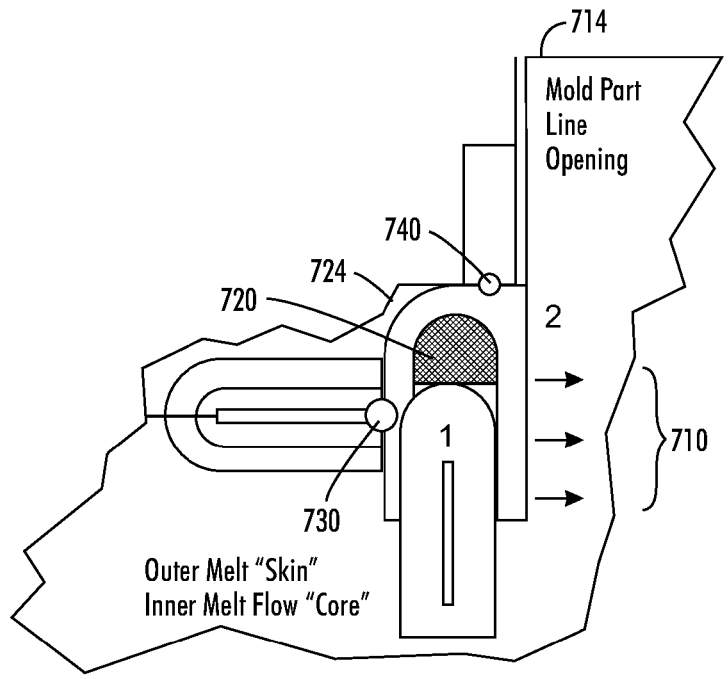
FIGS. 7A and 7B are representations of the melt shrink rate profile that may be indicated by an aspect of the invention disclosed herein.
Figure 7B:
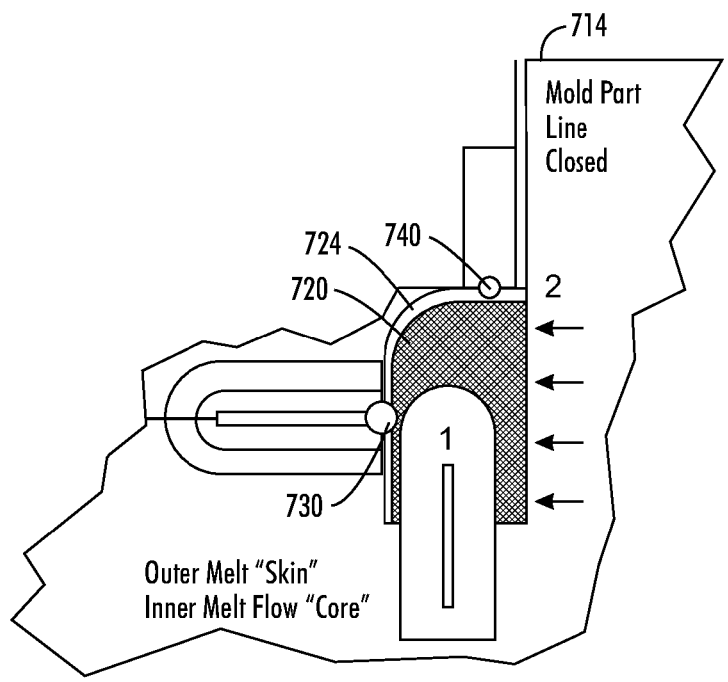

Turning next to FIGS. 7A and 7B, depicted therein is a representation of the use of the present invention to characterize the melt "SHRINK" rate profile. In FIG. 7A, there is depicted a representation of the cavity PACK volume, as best characterized by the resulting Mold Opening FORCE. The Mold Opening FORCE is equal to the melt Pressure times the cavity projected Area. When the cavity is packed, the forces 710 act on the mold, along the part line 714 and final internal packing of melt volume causes the mold parting line to open (expand) slightly, where the amount of expansion is a function of the force 710 relative to the mold clamp pressure and other parameters of the mold. As will be appreciated, the outer skin 724 of the melt flow 720 pushes into the cavity, and during the pack stage fills out the cavity and causes expansion thereof. In one embodiment, a thermocouple sensor junction 730 may be employed to sense the melt skin impinging thereon and to provide a direct readout of the temperature at the skin. Similarly, a second junction 740 may be employed along the part line (e.g., part line vent) to sense the point at which the skin or melt front reaches the second thermocouple junction, thereby producing a similar temperature rise. Moreover, the sensors not only detect the temperature of the melt at or in the skin, but further provide an indication of a pressure-effect as the pressure in the cavity increases to a point where the part is packed-out and begins to cause separation at the part line.

After packing, the part is allowed to cool, during which time the part shrinks somewhat in length and size. The resulting shrinkage is also detectable with the present invention as the molded part will shrink away from one or both of the sensors and will lose contact with the exposed thermocouple bead which surrounds the emf (electromotive force) junction between the dissimilar thermocouple leads. As a result, the bead may become detached from the melt material as it cools and thereby indicate the part shrinkage rate per unit time as depicted in a comparison of FIG. 7B with 7A.

The cavity melt SHRINK is a function of not only the melt inject temperature minus the melt cavity containment temperature, in other words the differential between the temperatures, but is also impacted by the CURE time. The shrinkage during the cure time is a direct result of the cavity melt SHRINK characteristic, and the control of the time may further impact the quality of the part. The molded part shrink dimension is established by the molding process cure time. As a cycle time is shortened, the molded part final shrink dimension and physical specification are changed. A shorter molding cycle time may increase productivity but may result in a defective molded product.

Figure 8:
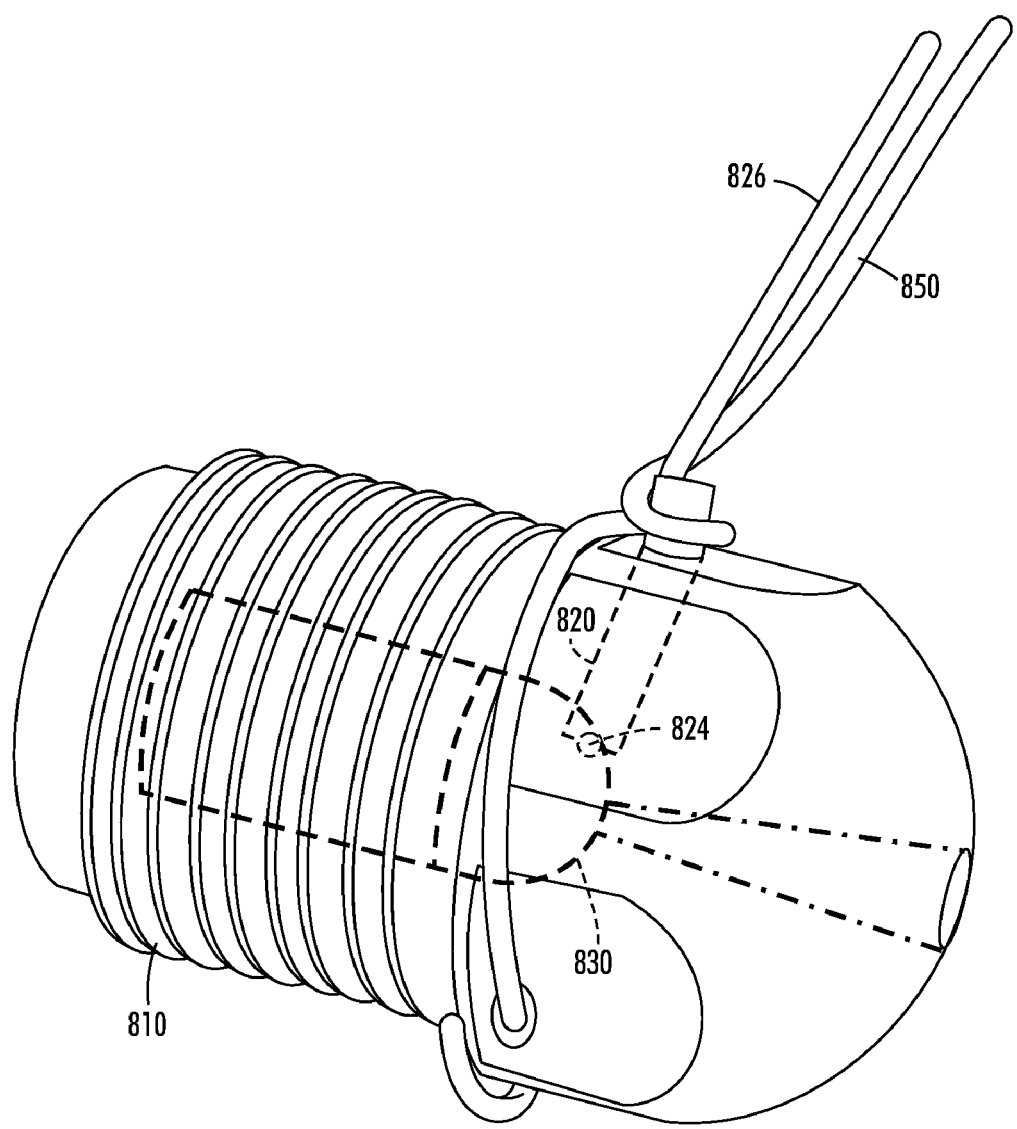
FIG. 8 illustrates an alternative sensor embodiment.

Depicted in FIG. 8 is an alternative embodiment for the application of a sensor in accordance with the present invention. In the nozzle insert 810 depicted, there is included a melt sensor 820 that is partially inserted so as to have its exposed bead 824 contact with the melt flow in region 830. The nozzle melt input sensor 820 may also include a strain-relief member 850 for supporting the thermocouple leads 826 after they exit the bushing in which they are inserted into the nozzle with.

In one embodiment, the nozzle may include a radial hole, or a hole extending into the melt flow region so as to permit a bushing housing the thermocouple to be inserted therein and locked in place. It will be appreciated that various mechanism may be employed to lock or hold the bushing and associated thermocouple in place, and that in one embodiment, the brass material may be crimped or otherwise deformed so as to provide an interference fit. It is further contemplated that the bushing may be held in place by an adhesive or using a set screw or similar mechanical locking means. In the depicted embodiment of FIG. 8, a 0.5 inch radius, reverse-taper nozzle 810 is fitted with 0.040 inch diameter thermocouple leads and a wire support 850.

Figure 9:
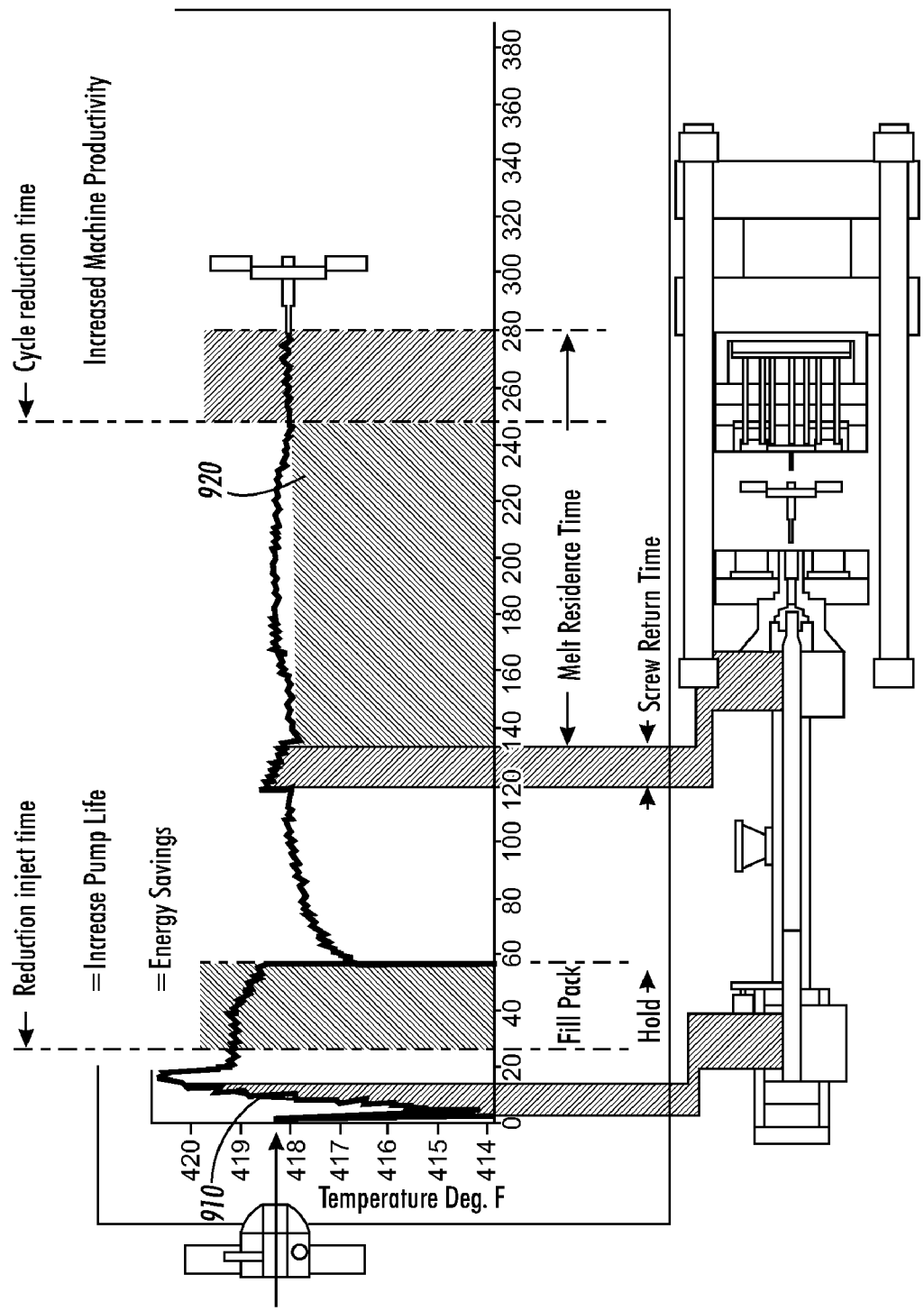
FIG. 9 is an illustration of exemplary data obtained with an aspect of the disclosed invention.

Using a nozzle as depicted in FIG. 8, a molding system was operated and data derived from the thermocouple sensor 820 was analyzed and plotted versus time. An exemplary representation of the data is found in FIG. 9. Referring also to FIG. 9, which depicts the plotted data relative to the molding machine along the bottom thereof, it is possible to see opportunities for machine energy and cycle-time savings. More specifically, in region 910 of the curve it is indicated that the molding process includes an injection time that is likely over-extended. Thus, it would be possible to increase pump life and energy savings by reducing the injection HOLD or PACK period. Similarly, it may be possible to further reduce the cycle time by decreasing the melt residence time 920 in the barrel of the molding machine, and by doing so increase the productivity of the molding system.

Figure 10:
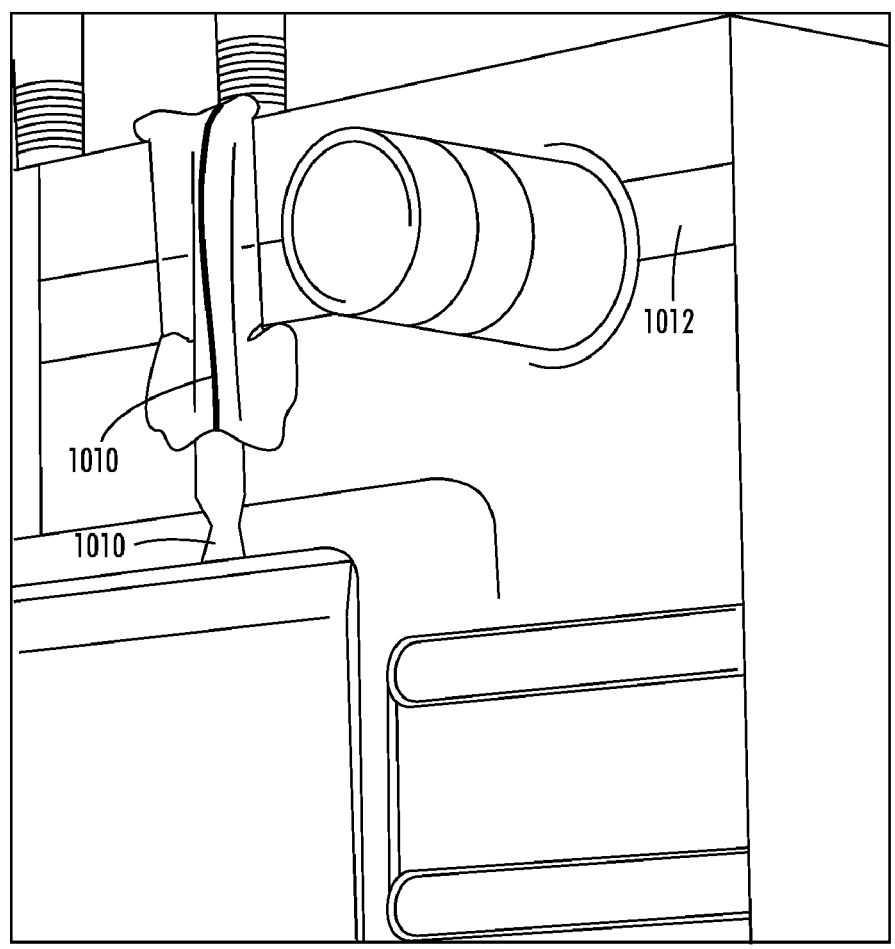
FIG. 10 illustrates a vent sensor in an embodiment if the present invention.

Turning to FIG. 10, there is depicted a vent sensor that, due to the small thermocouple lead size (0.010 inches or less), may be placed in a vent groove or similar aspect of the mold surface in order to provide for timely analysis/review of the process parameters. More specifically, FIG. 10 illustrates a vent sensor 1020 taped into a vent groove 1010 of a mold 1012. The vent sensor is place into the vent groove and as a result is able to monitor and provide data relative to the mold cycle. As indicated previously, the use of the sensor in this manner, particularly in a vent, may permit the identification of possibly shorter cycle, with higher heat retention. The resulting profiles show the flow of melt materials and may be further employed to control or monitor a hot runner, gate side mechanism. An example of a profile arising from sensing of the molding process using a vent sensor is found in FIG. 11.

Figure 11:
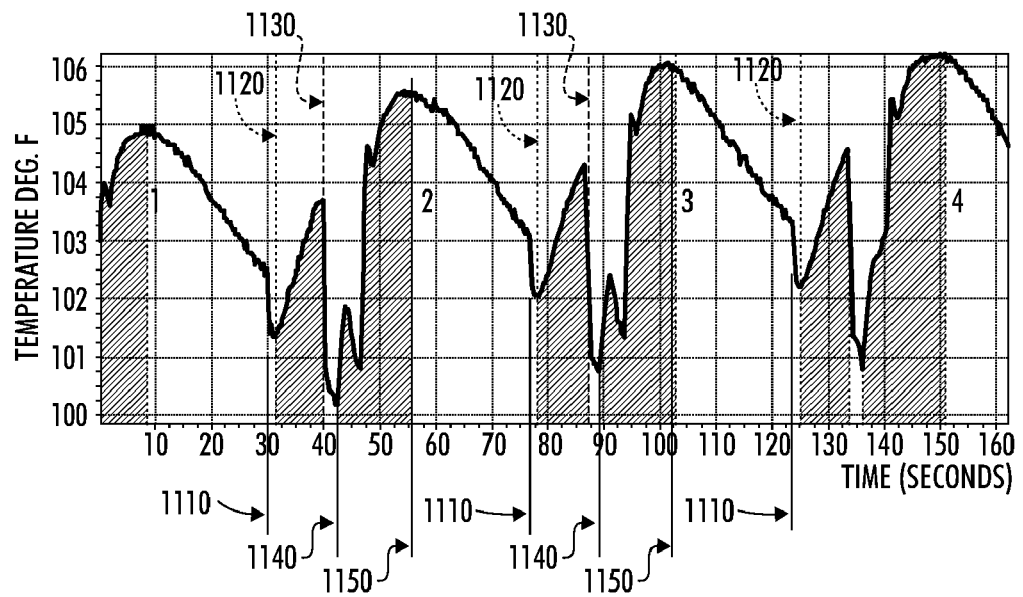
FIGS. 11 and 12 are exemplary illustrations of various cycles of a molding process.

Referring to FIG. 11, there are depicted portions of four cycles of a vent temperature/pressure cycle profile labeled therein as 1 through 4. Each complete cycle starts after a mold open phase 1110, where the mold has closed 1120, followed by a start of the melt material filling the cavity 1130. After that point, the vent or exhausted cavity air is detected as the material moves toward and begins to fill the cavity, as indicated by the rise in temperature beginning at 1140. The rise continues until a peak is reached when the cavity is filled at 1150, and then the part is allowed to cool and cure before the mold is once again opened at 1110.

Figure 12:
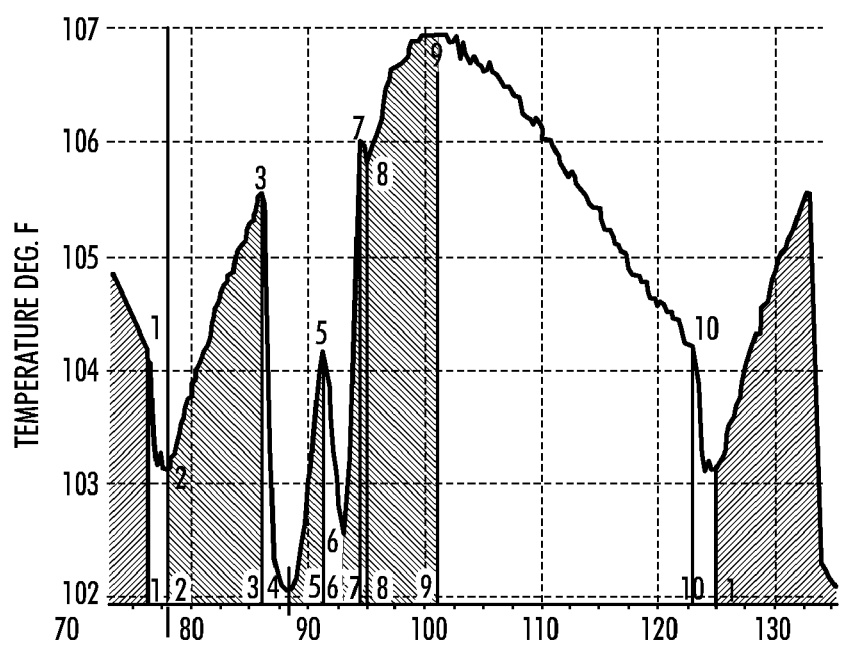
Figures 13, 14:
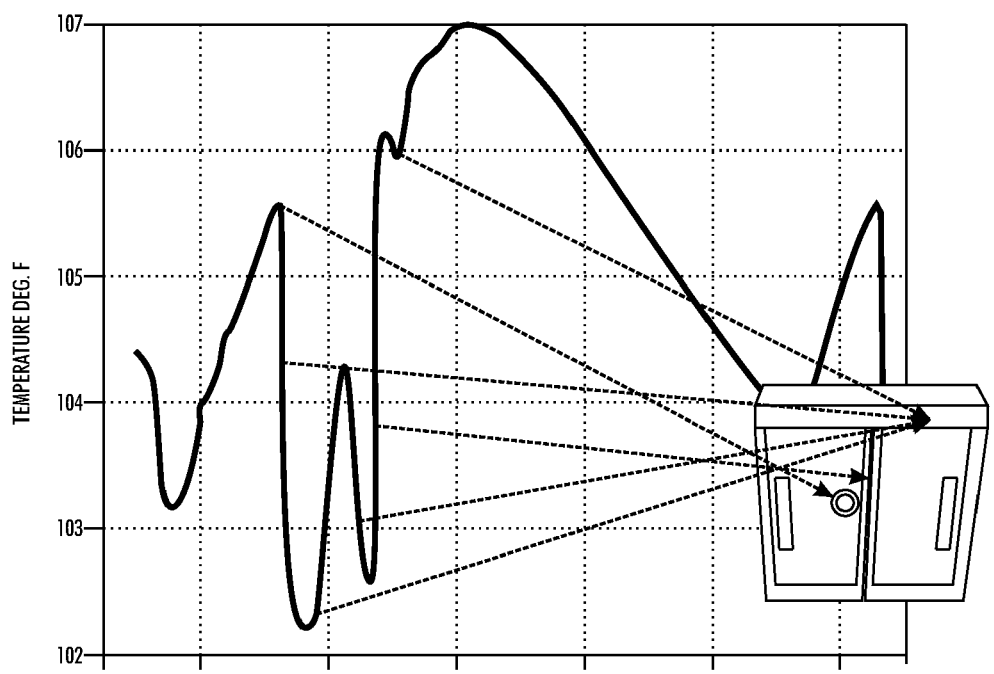
FIGS. 13 and 14 are tabular and graphical illustrations of data in accordance with an aspect of the disclosed invention.

In FIG. 12 a representation of a single cycle similar to that set forth in FIG. 11 is depicted, but in this case the processing stages are superimposed on the mold close vent melt cure open graph—where the stages of DETECT (1210), DEFINE (1220) and DECIDE (1230) are depicted. Along with FIG. 12, the data point of FIG. 13 represents the various points along a typical process curve, with exemplary data obtained from the melt vent sensor. It is noted that the temperatures depicted in the table of FIG. 13 may appear to be slightly lower than expected, but that the vent temperature profile is less likely to provide extreme temperature cycles as the readings are buffered to a certain extent by the mass of the mold itself. Referring also to FIG. 14, the cycle profile of FIG. 12 has been further annotated to include the various melt vent temperature points as indicated by the numbers 1-10 that correspond to those set forth in the table of FIG. 13. Furthermore, FIG. 14 includes an illustration of an exemplary part, indicating the corresponding position of the melt material mold front as the injection molding process proceeds.

FIG. 14 is believed to be an exemplary indication of the effect of the temperature and pressure changes present in the mold, as sensed by the exposed, micro-bead of the thermocouple. In other words, the temperature and pressure acting on the micro-bead thermocouple mass as well as the EMF junction. Moreover, the exposed bead is believed to further permit the sensing of not only CONVECTION heating but also conduction and radiant heating (e.g., absorbtivity, emissitivity) and black body effects.

Figure 15:
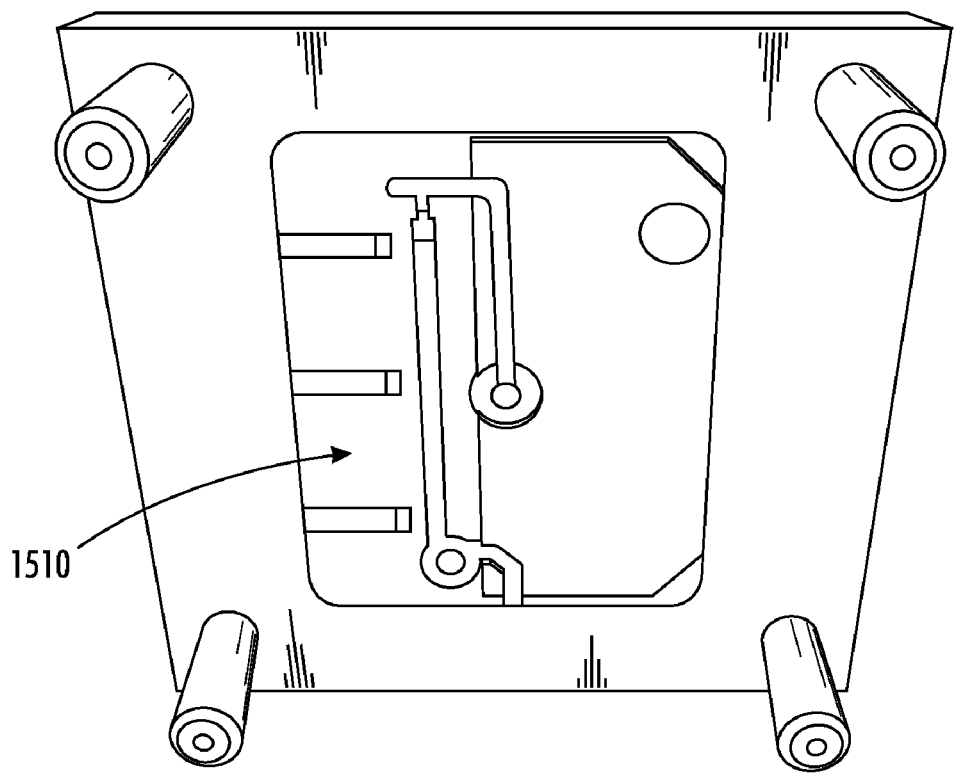
FIGS. 15 and 16 illustrate the application of the present invention in a vent sensor embodiment for sensing temperature and pressure changes in the molding process.

Having provided several examples of data that may be obtained from a mold vent sensor, attention is turned to FIG. 15, where an exemplary embodiment of a vent sensor is depicted. In the embodiment, the sensor is referred to as a sprue-side sensor, where it is attached to a surface of the sprue side of the mold cavity 1510. As indicated on in the figure, the presence of the sensor may leave what is referred to as a "witness line" on the surface of the part.

Figure 16:
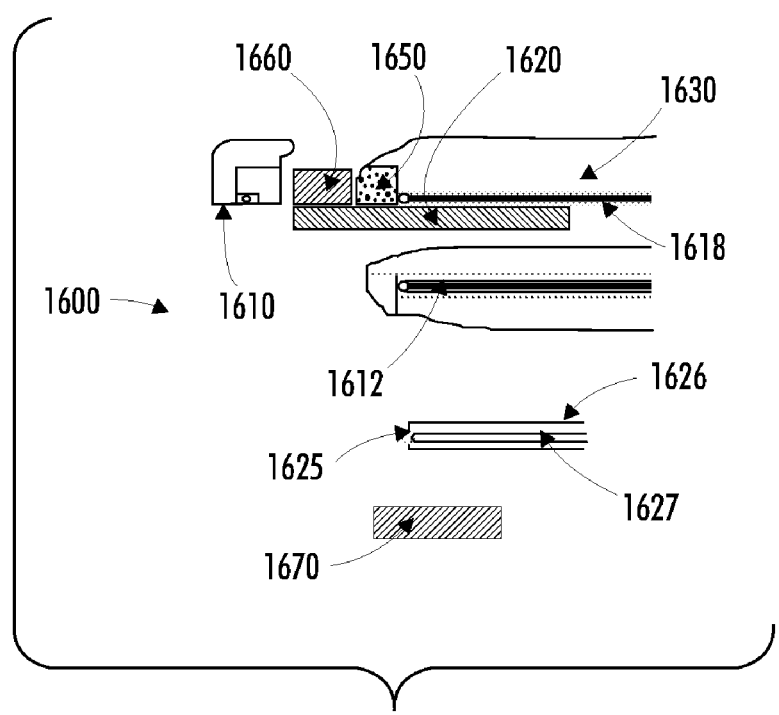

Referring also to FIG. 16, there is depicted an alternate arrangement for a vent-melt thermocouple strip in a mold-close system. Depicted therein is mold assembly 1600, mold part line 1610, and a vent groove 1612. In the Mold Close Half 1620 a thermocouple assembly 1618 is employed and includes a fused thermocouple bead 1625 as well as thermocouple wires 1626 and 1627. The assembly further includes an insulating strip 1630. In the embodiment depicted, the mold close melt venting and flow front sensing can be accomplished using the exposed micro-bead thermocouple. Moreover, because the strip can be placed at the edge of the cavity, it may also be used for flash detection (indicated by a rapid rise in temperature resulting from exposure to the melt material).

Also depicted in the illustration of FIG. 16 are representations of the Melt Gas Venting Flow Stage 1650, including when the melt inject vents trapped site gases followed by the melt injection causing melt front gases to be vented. FIG. 16 includes the following components: Mold 1600, Mold Cavity Edge 1610, Mold Cavity Vent groove 1612, Mold vent gases 1618, Mold Eject side 1620, Vent sensor 1625, Vent sensor Bottom strip 1626, Vent sensor (+) wire 1627, Vent sensor Bottom (−) wire 1628, as well as a Vent sensor cover strip 1629 Mold End of Cavity 1630, Melt 1660, and Melt gas front 1650. In the melt fluid flow stage 1660, the melt Injection produces additional heated gas to be vented as the cavity is filled and packed. Then, during the melt cure stage 1670, the melt cures and shrinks in the cavity.

Figure 23A:
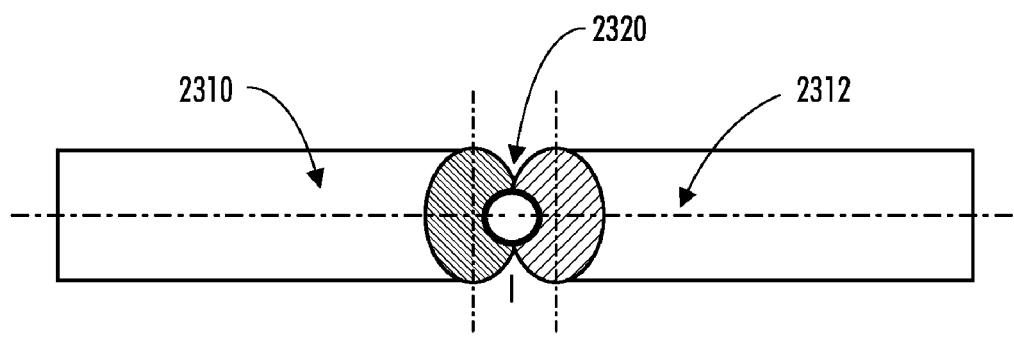
Figure 23B:
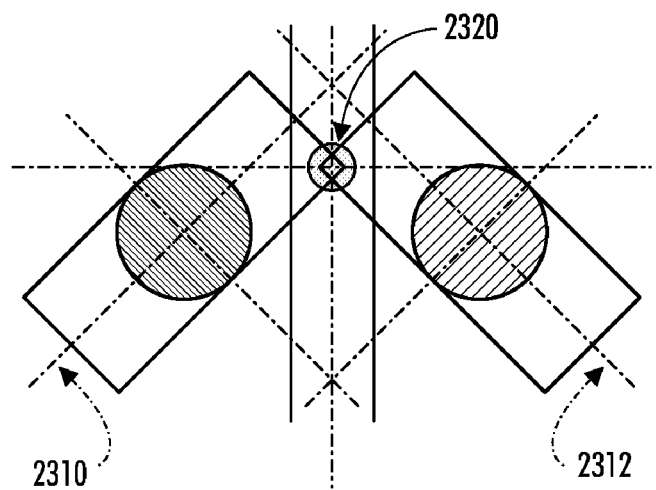

Turning briefly to FIGS. 23A and 23B, there are depicted two alternative views of a possible thermocouple junction in accordance with an aspect of the present invention. In the figures a pair of dissimilar metals leads 2310 and 2312 (e.g., iron and constant an (J-type)) are preferably fused together into a bead 2320, where the thermocouple junction is formed. In one embodiment the 0.001 leads are used to form a fused bead having a size equal to the thermocouple leads, although it is conceivable that a bead and/or junction of smaller size may be prepared, or that a larger bead may be prepared. Here again, it is presently understood that the smaller the resulting bead and EMF junction, the more responsive the thermocouple will be to applied thermal and pressure changes.

Figure 24:
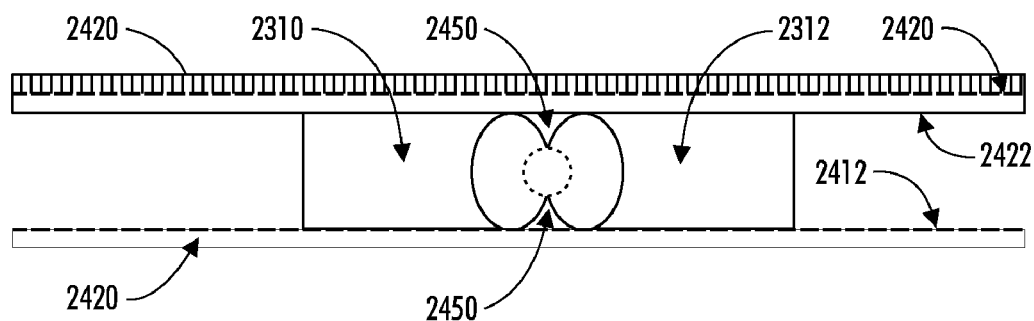
Figure 25:
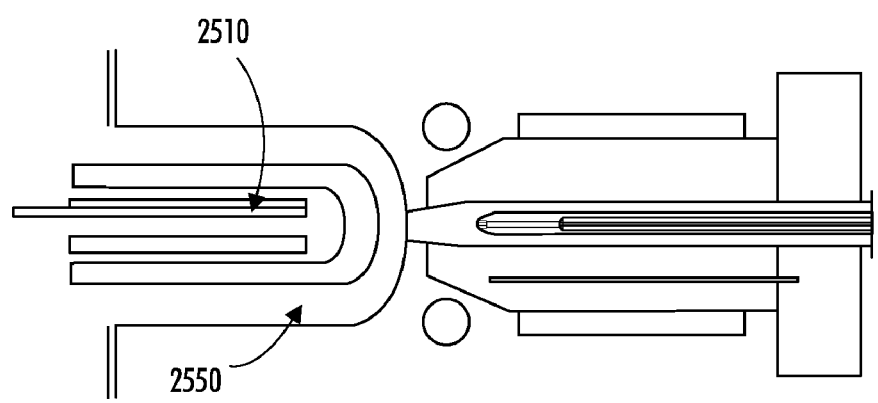
FIG. 25 is an exemplary illustration of an alternative embodiment of the present invention.

In an alternative embodiment it may be possible to produce a simple, inexpensive thermocouple that can be applied to an existing mold vent groove. As depicted, for example in FIG. 24, the joined leads, or possibly even leads that are not joined but are maintained in physical contact mechanically (e.g., an adhesive tape force), are placed against the adhesive side 2412 of a tape substrate material 2410. Next, the junction is placed onto the back or non-adhesive side 2422 of another tape substrate 2420. Thus the tapes are used to affix and separate the wire leads 2310 and 2312. Subsequently the assembly may be attached or affixed to a mold or other surface for which temperature—pressure monitoring is required by simply applying the adhesive side of tape substrate 2420 to the mold surface 2430. As indicated in the figure air gaps 2450 allow the bead 2320 to remain partially exposed within the gap between the two tapes.

Figure 17:
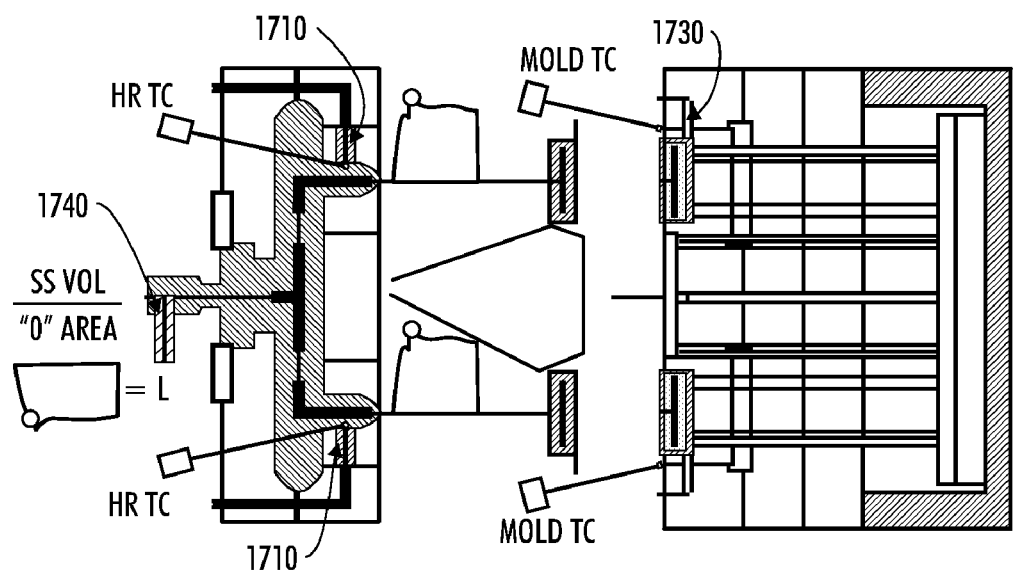
FIGS. 17 and 18 depict the use of the present invention in accordance with a gate pin embodiment for sensing temperature and pressure during the molding process.

Turning back to FIG. 17, depicted therein is an embodiment of the invention wherein an exposed-junction thermocouple is designed for use as a hot runner gate melt sensor. In the embodiment depicted, the melt temperature-pressure sensor 1710 and 1720 employs an exposed bead thermocouple 1720 that may be placed into the contained heated melt volume through the gate. It is also the case that additional thermocouples may be employed in the mold as well as in the mold (1730) and the nozzle (1740).

Figure 18:
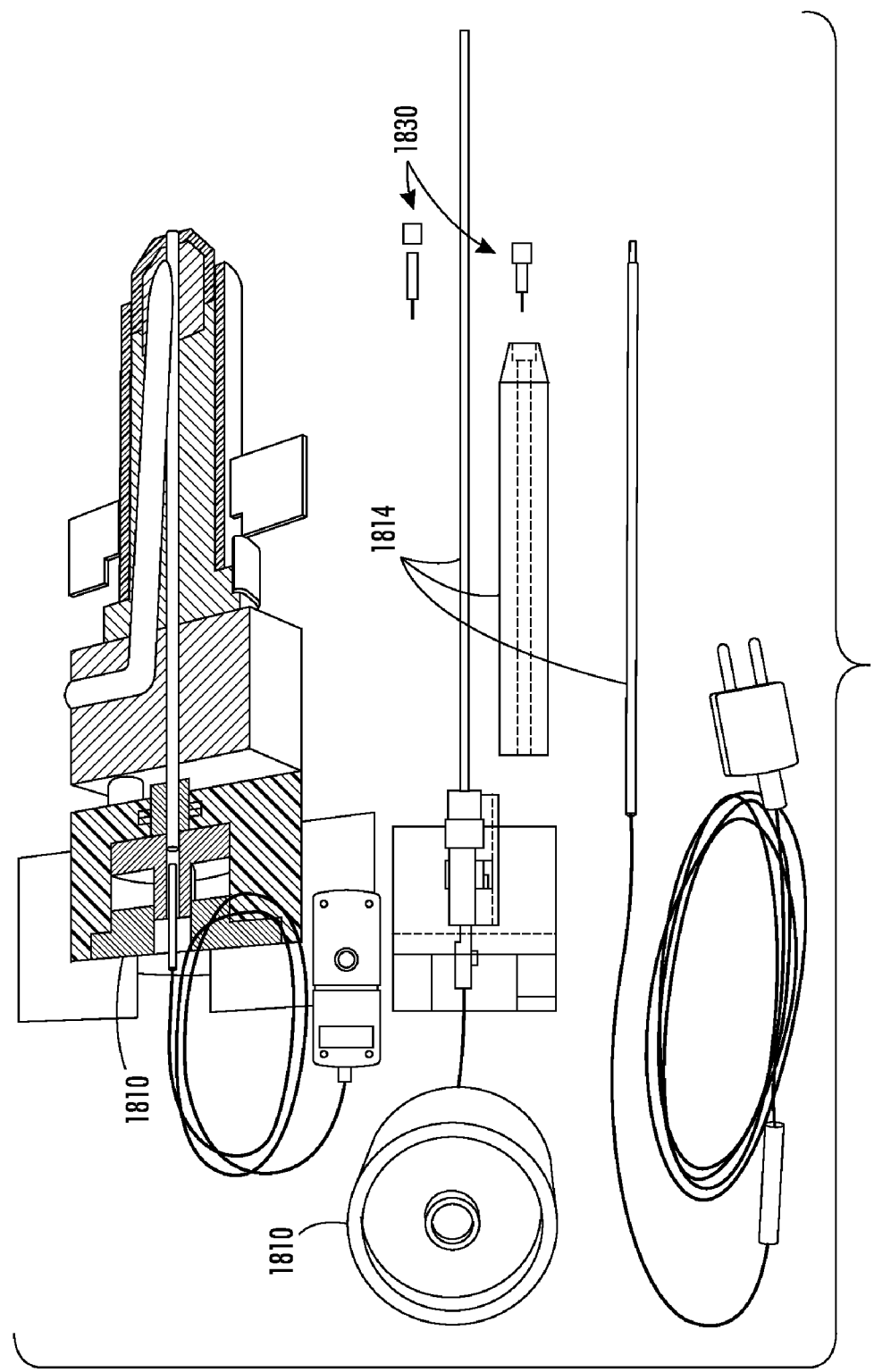

An exemplary embodiment of the valve gate thermocouple installation is found in FIG. 18. In the figure, there are depicted several views of the thermocouple configuration within, for example, a pneumatic valve gate such as that sold by Incoe™. In particular, a valve gate actuator 1810 is used to drive the pin 1814, but the traditional pin is replaced with a hollowed out or bored pin to permit the insertion of the beaded thermocouple wires therein. The hollowed out region includes a recessed tip, where a fitting assembly 1830 may be employed to not only seal the bore 1818, but also to rigidly affix the thermocouple junction at the end of the pin. Assembly 1830 include one or more conformable pieces (e.g., brass or the like) that are suitable for providing a press, interference fit in the end of the gate pin 1814.

As will be appreciated, the presence of the exposed thermocouple at the tip of the gate pin allows the temperature and pressure of the melt material to be sensed instantaneously as it passes the end of the pin through the gate and into the runner and mold cavity. Upon detection of the temperature and pressure rise resulting from cavity fill, the individual gates may be closed, thereby enabling the independent control of the gates in accordance with the filling of particular cavities to a selected temperature-pressure density set point.

Figure 19:
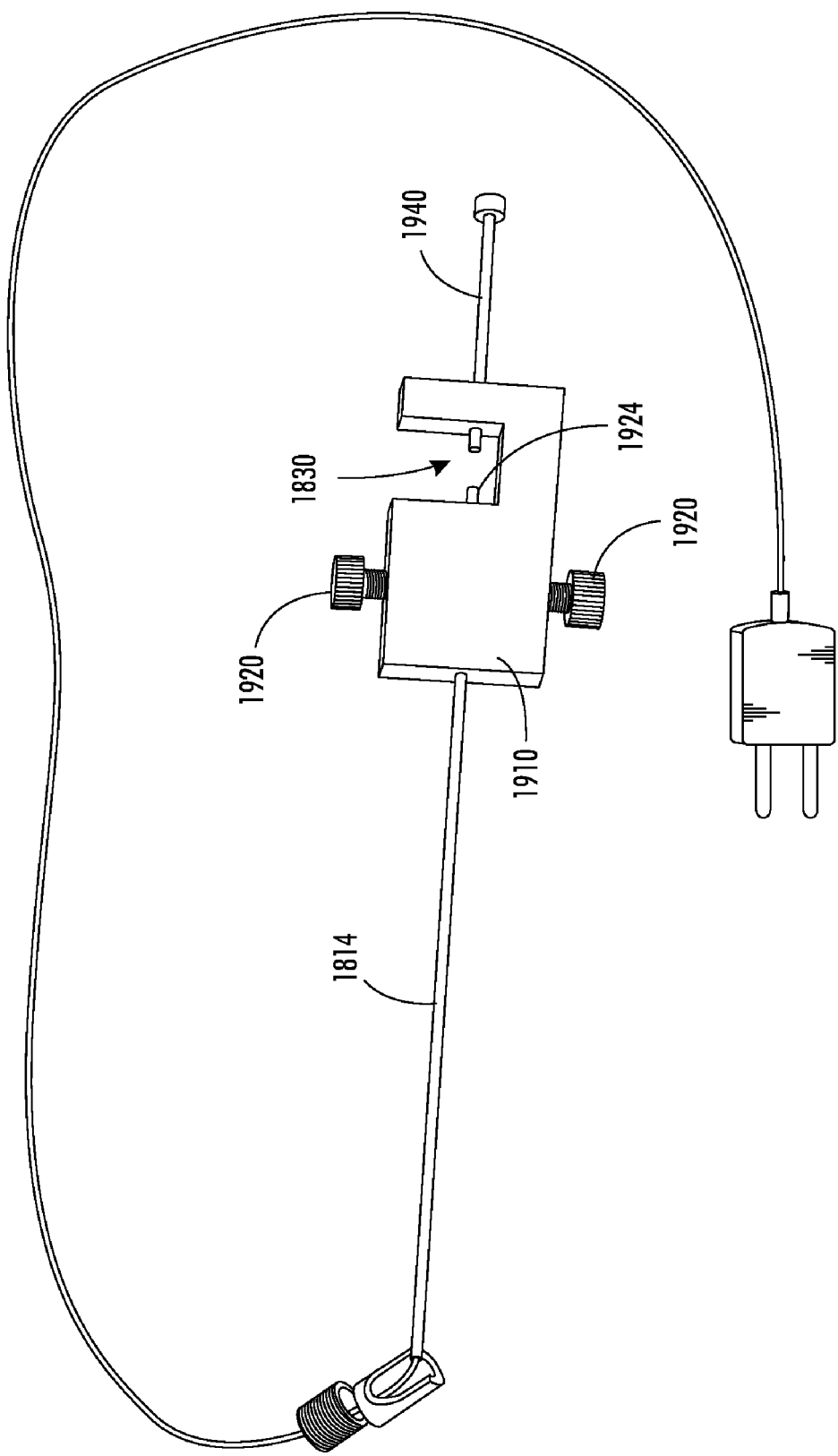
FIG. 19 is an illustration of an assembly tool suitable for installing the sensor into the pin of FIGS. 17 and 18, particularly in accordance with the various steps depicted in detail in FIGS. 20A-C.

As may be appreciated, the assembly of the valve or gate pin with an embedded thermocouple requires accurate and reliable means to aid in the assembly. The present disclosure further includes a brief description of the assembly/press fitting device 1910 depicted in FIG. 19. In the device, a bored or hollowed out pin may be placed into a hole in fixture 1910 and is retained therein by set screws 1920. After threading the thermocouple leads and associated bead the length of the pin, a small portion is exposed at the end 1924 of the pin. The outer ring and collet assembly is then placed on the end of driver 1940 and is pushed into the end of pin 1814 where upon application of force, the assembly is forced into an interference fit and forced to remain fixed in the end of the pin.

Figure 20A:
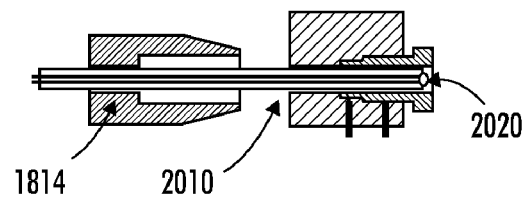
Figure 20B:
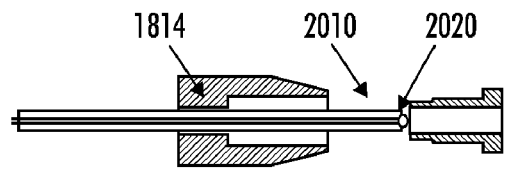
Figure 20C:
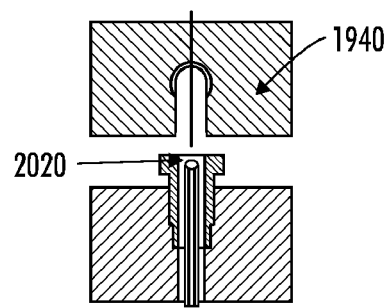
Figure 21:
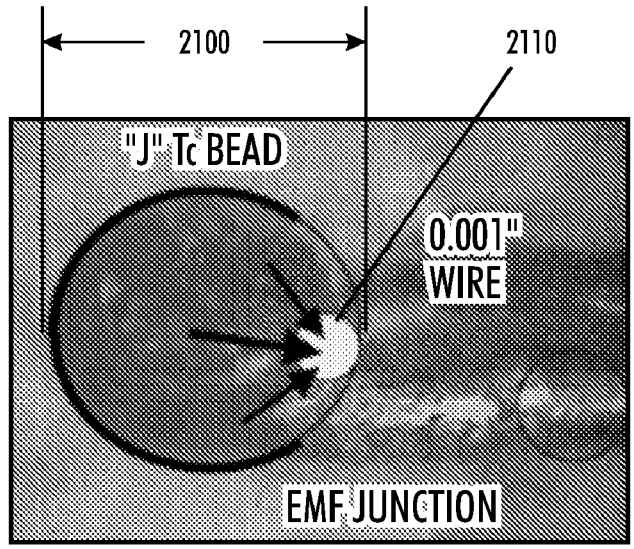
FIGS. 21 and 22 are an exemplary, enlarged, views of an electromotive force (EMF) junction in accordance with embodiments of the present invention.

Referring also to FIGS. 20A-C, an enlarged view of the elements depicted is shown so as to further explain one embodiment of the invention. In this embodiment, a shielded thermocouple is employed, where the shielding 2010 on the end thereof has been removed and an exposed junction 2020 is present. In the process steps illustrated in FIGS. 20A-C, the sealing assembly is either crimped or staked to the end of the pin 1814 before or upon insertion into the end of the pin using force applied by the driver 1940. In any event, the force of pressing the assembly 1830 into the end of the pin causes a deformation such that the thermocouple tip is effectively held within the end of the pin.

Having described several embodiments wherein the improved micro-bead, exposed junction thermocouple may be employed, the disclosure is now turned to particular aspects of an embodiment of such a sensor—particularly a sensor suitable for monitoring temperature and/or pressure variations in a manufacturing process such as molding and the like. In one embodiment, the vent temperature and pressure melt sensor is intended to utilize a thermocouple wire on the order of 0.001 inch in diameter. Using a laser welding process to form the thermocouple junction between two dissimilar wire leads, the bead diameter is on the order of 0.003" inches in diameter, and preferably in the range of 0.001 inches to 0.010 inches, although it is believed that a smaller junction bead leads to improved responsiveness to temperature. It is, however, also possible to sense pressure changes in the vent gas and melt flow, where Pressure=Force/Area, the smaller the diameter of the junction bead mass diameter 2100 results in a smaller terminating EMF fused material junction 2110; the greater the concentration of force on a smaller bead mass (smaller surface area) the greater the concentration of resultant force and generated strain on the small EMF bead mass.

Figure 22:
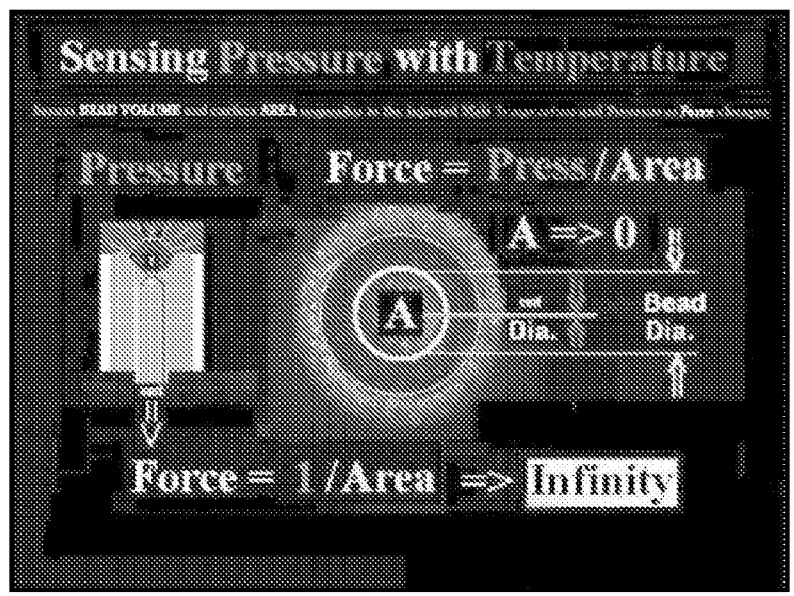

Thus the response of the micro-bead junction 2110 is a combination of the temperature and pressure acting on the EMF junction. Moreover, the STRAIN of the spherical bead is directed to the EMF junction. As a further illustrative example, consider an Area change from MEAN Diameter=Pi·$D^2$±?D. The Area Increase is NOT equal to the change from nominal by the factor +2 ?$D^2$ or (D±?D)$^2$, where (D+?D)$^2$=2$D^2$+2?D+?$D^2$ and (D−?D)$^2$=2$D^2$−2?D+?$D^2$. Rather the (−) Area is smaller by the same that the ±2?D factor, but the smaller area is less by a +?$D^2$ exponential ratio, thereby leading to force concentration and responsiveness to pressure variations. A further representation of this feature is depicted in FIG. 22, where the impact of pressure is illustrated with respect to a decreasing size junction. Where the junction size decreases to a smaller and smaller size, the pressure sensed on the junction of the thermocouple is effectively increased, wherein the traditional thermocouple junction further becomes sensitive to pressure changes as well as temperature changes, and can produce signals indicative thereof. In other words, the micro-bead junction is believed to produce a significant EMF response to both changes to temperature as well as pressure.

A further representation of this feature is depicted in FIG. 22, where the fused junction of the two thermocouple wires is at an angle to minimize the EMF mating junctions on the circumferential edge. This creates a small venting gap at the top and bottom of the fused EMF junction to allow the venting gases to act on a minimum fused function and increase the response to temperature-pressure changes.

Figure 26:
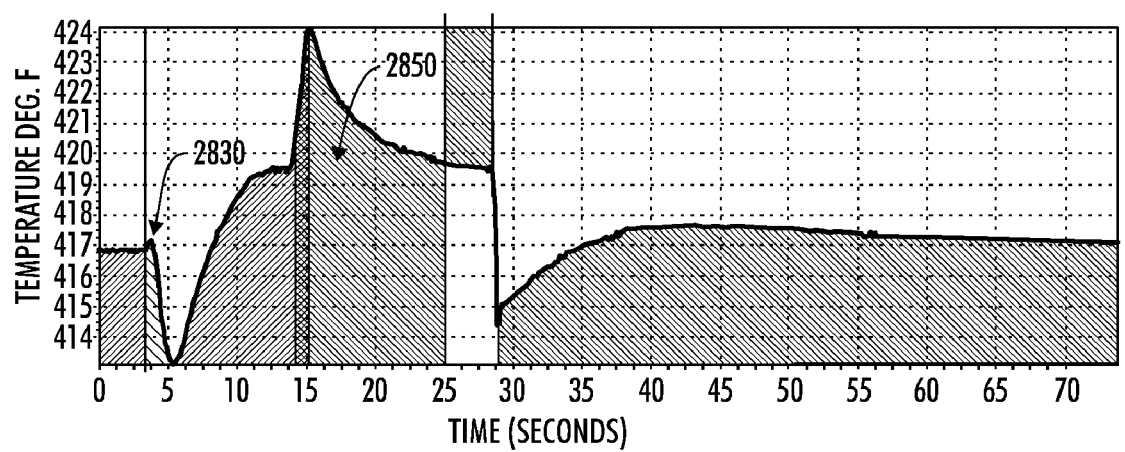
FIG. 26 is an illustrative example of a melt profile in accordance with an aspect of the invention.

Turning to FIG. 26, the figure depicts the molding process stages from open to close and injection of a cold runner mold. The injected melt flow temperature-pressure density sequence shows the short rise at the start of inject through the nozzle orifice, drop in temperature-pressure during fill of the sprue and four runners. A rise in temperature-pressure starts as the gates restrict the melt flow into the four cavities of the part sown in the upper right, a sharper rise occurs as the machine nozzle freezes closed and the barrel melt cushion of material is compressing. Upon complete shut off, a peak temperature-pressure density point is reached.

Continuing with FIG. 26, illustrated therein is an exemplary nozzle melt process profile 2810, as an example of the nozzle profile obtained with a thermocouple configuration similar to that depicted in FIG. 8. As illustrated, the cycle initiates with the sensing of melt material passing through the nozzle, followed by a slight temperature rise at 2830, when the melt material encounters the sprue system. As the melt material proceeds to fill the sprue and runner to the restricting gate, the temperature decreases slightly due to the free melt flow front and then increases as the material passes through the gate and the melt temperature-pressure increases as the mold cavity(ies) beginning to pack out. Once packed, the machine melt cushion density further increases sharply to machine nozzle freeze off. The decrease in temperature-density occurs before diminishing to a sharp drop off at the end of machine melt injection time as seen in region 2850.

Upon mold opening there is an increasing negative pressure in the cavity as the molded part is pulled out of the cavity. This is another temperature-pressure signature point. At release from the molded cavity a rise in the part temperature-pressure occurs. And, upon part ejection from the core there is an increasing negative pressure as the part is stripped from the core. The machine material injection pressure may be stopped after that point in time because the mold melt flow volume is completed.

A sharp drop in temperature-pressure is noted at the end of the machine material melt injection time. The gradual rise in the temperature-pressure profile results from the material melt cushion increasing in volume before the screw is rotated to generate the next shot size. As an example, see FIG. 9 for the screw return rise and drop in temperature-pressure profile for a subsequent melt shot size. The screw return profile indicates the machine melt mixing consistency, material melt quality and wear, as the screw is used. The impact of cycle time reduction to the quality of the molded part is now measurable.

As previously described relative to FIG. 14 the temperature-pressure sensitivity to venting gases, melt fluid and final cured solid part may be monitored and displayed. The temperature-pressure sensing capability can be used for injected gas and fluid molding, where material sink and material weight is needed. The sensor fits the extrusion process where the extrudant exits into the atmosphere as a tube or sheet. The extruder screw pulsing and exit material "swell" can be profiled in accordance with the aspects of the invention disclosed herein.

Similarly, blow molding, metal injection molding, thermo-sets and liquid silicone rubber can use the temperature-pressure sensing and proofing capability to define a process limit for production of a consistent part, whether cyclic or continuous. Thermoforming a part requires a consistently heated sheet to produce parts that are formed in a cavity by vacuum or pressure. Sensor contact with the initial film for forming can determine the temperature-pressure range and accept, adjust or reject the process material and/or machine conditions.

As will be further understood, the temperature-pressure sensing capability of the embodiments disclosed herein can be used for injected gas and fluid molding, where material sink and material weight needs are needed and can now be monitored. The sensors described herein fit the extrusion process where the extrudant exits into the atmosphere as a tube, sheet or similar extruded cross-section. The extruder screw pulsing and exit material "swell" can be profiled using the techniques and systems described herein.

Furthermore, as noted previously, blow molding, metal injection molding, thermo-sets and liquid silicone rubber can use the temperature-pressure sensing and proofing capability disclosed to define a process limit for production a consistent part, whether cyclic or continuous. Moreover, thermoforming a part requires a consistently heated sheet to produce parts that are formed in a cavity by vacuum and/or pressure. Sensor contact during the initial film before and during forming thermal process can determine the temperature-pressure range and accept, adjust or reject the process material and/or machine conditions.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

It is, therefore, apparent that there has been provided, in accordance with the present invention, a method and apparatus for the sensing of temperature and density of melt material at various points within a molding system, and the use thereof in a manner so as to enable the monitoring and maintenance of control within specified material, machine, and mold cavity thermal-mechanical specifications of the molding system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the disclosure.

What is claimed is:

1. An injection molding system, including:
   a multi-variable sensor comprising dissimilar metals formed into a micro-bead junction; and
   a programmable device, with associated memory, connected to and receiving a signal from said sensor, said programmable device periodically receiving the signal and recording said signal to record changes in said signal, wherein said programmable device is capable of storing said signals as data.

2. The injection molding system of claim 1, wherein said junction is located within a spherically shaped bead.

3. The system of claim 1 wherein said multi-variable sensor is located in a recessed well.

4. The system of claim 1 wherein said multi-variable sensor is at least partially located in a vent grove in a mold.

5. The system of claim 1 wherein said multi-variable sensor is operatively associated with a moveable pin within the molding system.

6. The system of claim 5 wherein said pin is selected from the group consisting of an ejector pin; and a gate pin.

7. The system of claim 1 wherein a response characteristic of said multi-variable sensor is a function of the size of the micro-bead junction.

8. An injection molding system, including:
   a multi-variable sensor wherein said multi-variable sensor includes a thermal-mechanical sensor having a micro-spherically shaped bead encapsulating an EMF junction comprising dissimilar metals formed into said micro-spherically shaped bead; and a programmable device, with associated memory, connected to and receiving a signal from said sensor, said programmable device periodically receiving the signal and recording said signal to record changes in said signal, wherein said programmable device is capable of storing said signals as data.

9. An injection molding system, including:

a multi-variable sensor comprising dissimilar metals wherein said multi-variable sensor includes an EMF junction encapsulated within a micro-spherically shaped bead, said junction being suitable for sensing changes in at least the temperature and pressure of a surrounding environment; and a programmable device, with associated memory, connected to and receiving a signal from said sensor, said programmable device periodically receiving the signal and recording said signal to record changes in said signal, wherein said programmable device is capable of storing said signals as data.

10. The system of claim 1 wherein said programmable device includes a display capable of representing data collected from said sensor so as to represent a density increase within a melt material as a temperature rise.

11. The system of claim 1 wherein said programmable device includes a processor suitable for processing the sensor data and representing the combined changes in temperature and pressure as a function of time.

12. The system of claim 8 wherein said multi-variable sensor is located in a recessed well.

13. The system of claim 8 wherein said multi-variable sensor is at least partially located in a vent grove in a mold.

14. The system of claim 8 wherein said multi-variable sensor is operatively associated with a moveable pin within the molding system.

15. The system of claim 14 wherein said pin is selected from the group consisting of an ejector pin; and a gate pin.

16. The system of claim 8 wherein a response characteristic of said multi-variable sensor is a function of the size of the micro-bead junction.

* * * * *